US012562659B2

(12) United States Patent
Martinez et al.

(10) Patent No.: US 12,562,659 B2
(45) Date of Patent: Feb. 24, 2026

(54) MATERIALS AND METHODS OF MANUFACTURING FLUID RESISTANT, BREATHABLE, AND ANTIBACTERIAL TRIBOELECTRIC NANOGENERATORS AND ELECTRONIC TEXTILES

(71) Applicant: Purdue Research Foundation, West Lafayette, IN (US)

(72) Inventors: Ramses Martinez, West Lafayette, IN (US); Marina Sala de Medeiros, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 206 days.

(21) Appl. No.: 18/535,883

(22) Filed: Dec. 11, 2023

(65) Prior Publication Data

US 2024/0186916 A1      Jun. 6, 2024

Related U.S. Application Data

(63) Continuation of application No. 17/340,935, filed on Jun. 7, 2021, now Pat. No. 11,843,328.

(60) Provisional application No. 63/035,980, filed on Jun. 8, 2020.

(51) Int. Cl.
*H02N 1/04*          (2006.01)
*A41D 1/00*          (2018.01)

(52) U.S. Cl.
CPC .............. *H02N 1/04* (2013.01); *A41D 1/002* (2013.01)

(58) Field of Classification Search
CPC ......... H02N 1/04; A41D 1/002; A41D 27/085

USPC .................................................. 310/309, 310
See application file for complete search history.

(56) References Cited

U.S. PATENT DOCUMENTS

| | | | | |
|---|---|---|---|---|
| 8,716,920 B2* | 5/2014 | Kim | ........................ | H10N 30/30 |
| | | | | 310/800 |
| 9,287,487 B2 | 3/2016 | Bae et al. | | |
| 11,843,328 B2* | 12/2023 | Martinez | ................ | A41D 1/002 |
| 2014/0151608 A1* | 6/2014 | Qi | ............................ | H01B 1/02 |
| | | | | 252/503 |
| 2015/0001993 A1* | 1/2015 | Park | ........................ | H10N 30/30 |
| | | | | 310/319 |
| 2015/0061460 A1* | 3/2015 | Bae | .......................... | H02N 1/04 |
| | | | | 977/948 |
| 2016/0156282 A1* | 6/2016 | Kim | ..................... | A61N 1/0484 |
| | | | | 607/61 |
| 2018/0091065 A1 | 3/2018 | Bae et al. | | |
| 2020/0106371 A1 | 4/2020 | Xiong et al. | | |
| 2020/0161990 A1* | 5/2020 | Lin | .......................... | H02N 1/04 |

(Continued)

FOREIGN PATENT DOCUMENTS

WO      2018182521 A1      10/2018

*Primary Examiner* — Ahmed Elnakib
(74) *Attorney, Agent, or Firm* — Reichel Stohry Dean LLP; Natalie J. Dean

(57) ABSTRACT

Triboelectric nanogenerators are provided that are textile-based, combine embroidery, silanizing agents, highly networked conductive nanoparticles, and a conformable electronegative layer, and can produce a stable energy source with high power density. Electronic textiles are also provided that utilize such triboelectric nanogenerators to convert the biomechanical energy of a wearer into electrostatic energy that can power electronic devices coupled with the triboelectric nanogenerator. Methods of manufacturing the triboelectric nanogenerators and related electronic textiles are also provided.

20 Claims, 15 Drawing Sheets

(56)　　　　　References Cited

U.S. PATENT DOCUMENTS

| 2021/0144848 | A1 |  | 5/2021 | Chung et al. |  |
|---|---|---|---|---|---|
| 2021/0380821 | A1 |  | 12/2021 | He et al. |  |
| 2021/0384847 | A1 | * | 12/2021 | Martinez | H02N 1/04 |
| 2024/0186916 | A1 | * | 6/2024 | Martinez | H02N 1/04 |

* cited by examiner c)
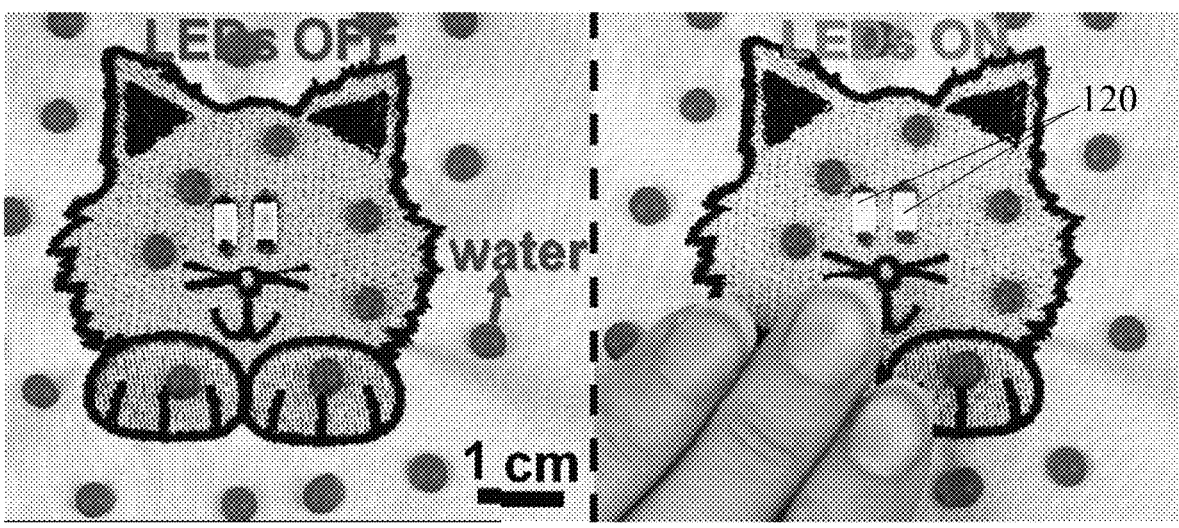
d)
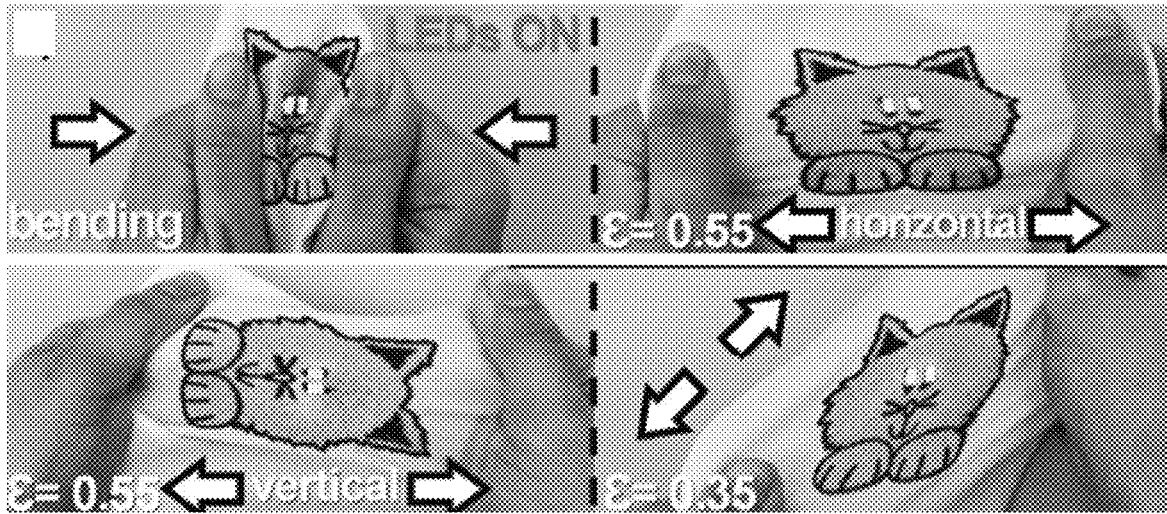
*Fig. 2 cont'*

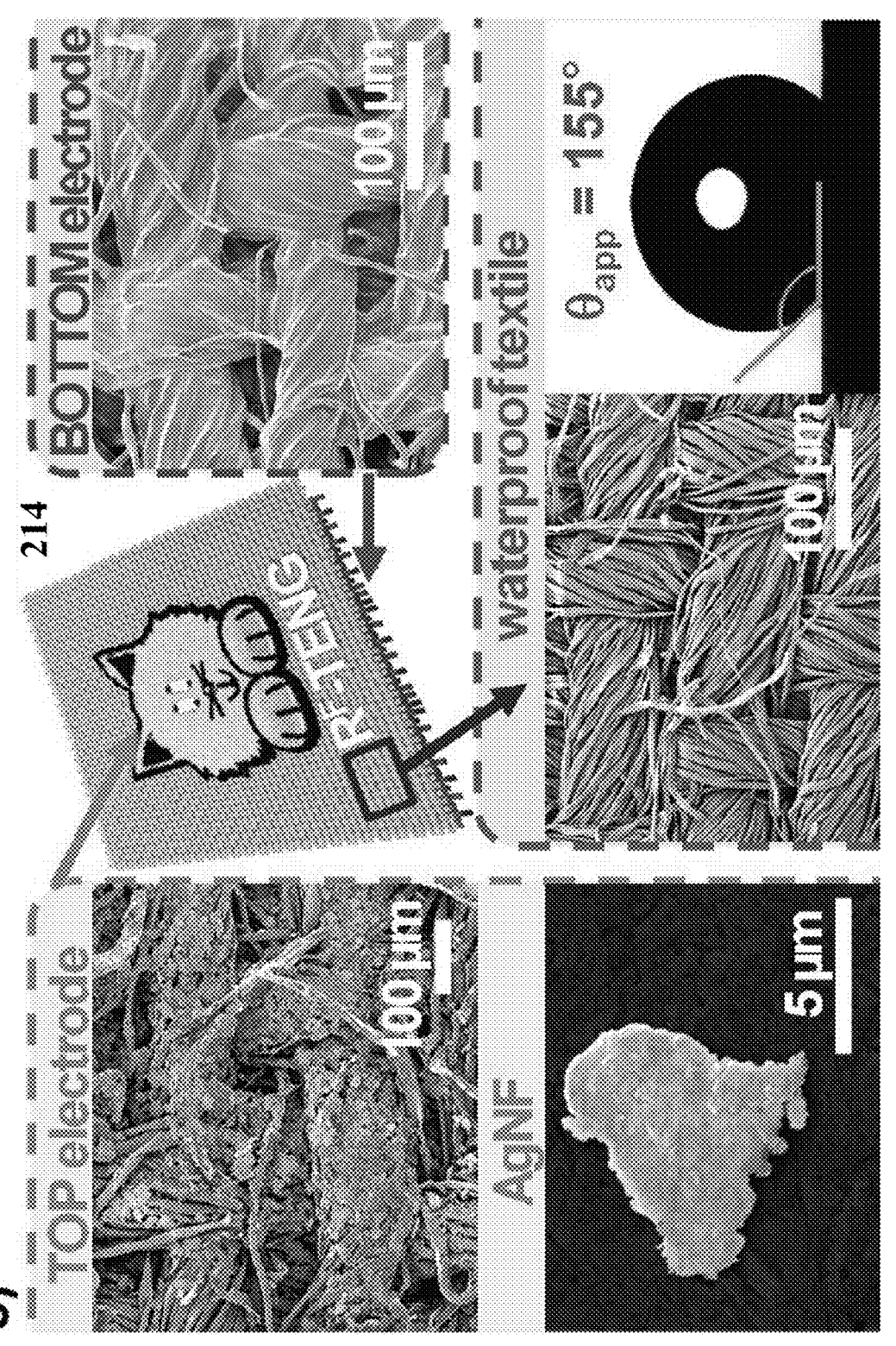
*Fig. 3 cont'*

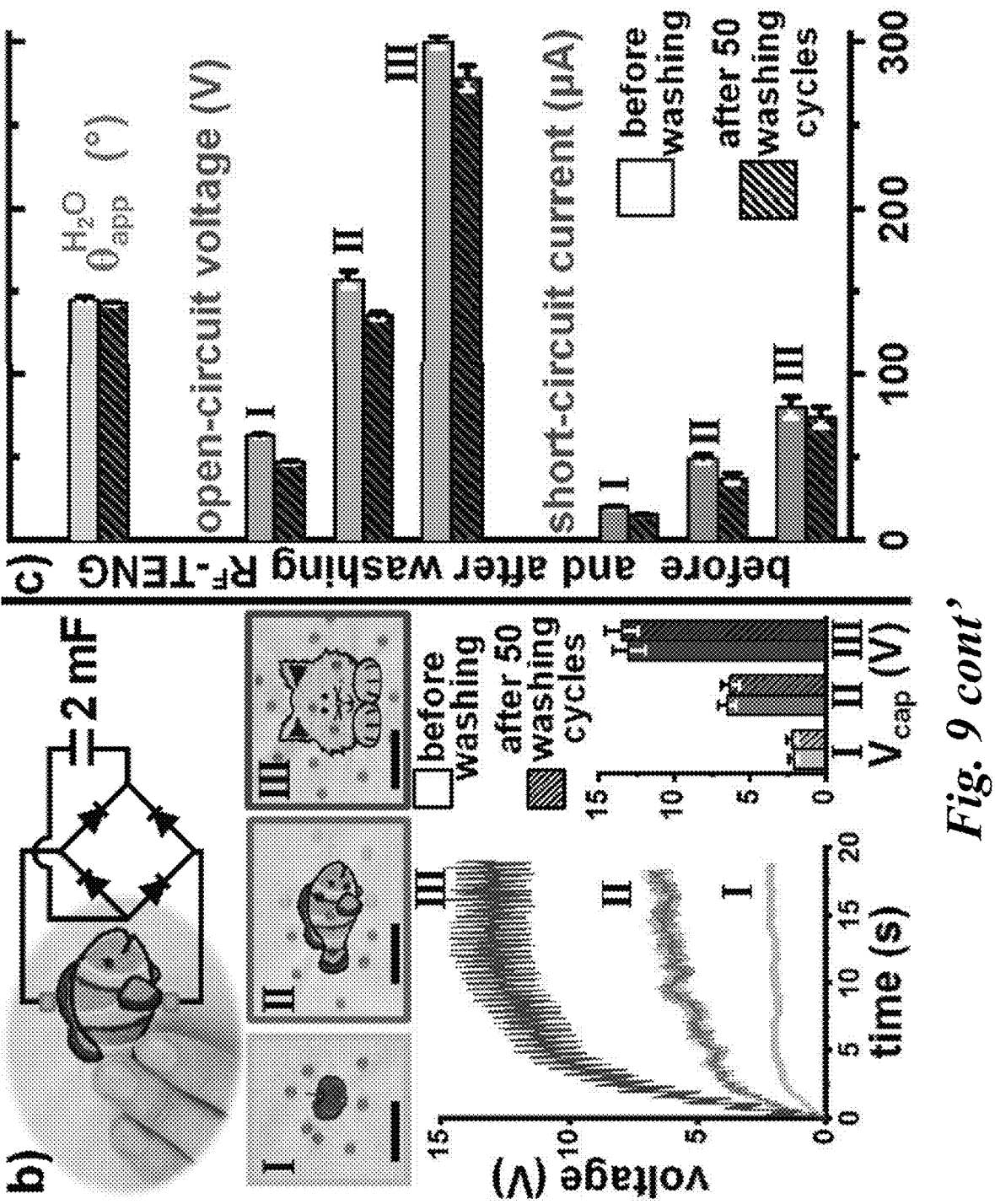
*Fig. 9 cont'*

MATERIALS AND METHODS OF MANUFACTURING FLUID RESISTANT, BREATHABLE, AND ANTIBACTERIAL TRIBOELECTRIC NANOGENERATORS AND ELECTRONIC TEXTILES

PRIORITY

This application is related to, is a continuation of, and claims the priority benefit of U.S. patent application Ser. No. 17/340,935, filed Jun. 7, 2021, and which issues as U.S. Pat. No. 11,843,328 on Dec. 12, 2023, which is related to and claims the priority benefit of U.S. Provisional Patent Application Ser. No. 63/035,980 to Martinez et al. filed Jun. 8, 2020. The contents of the aforementioned applications are hereby incorporated by reference in their entireties into this disclosure.

FIELD

This disclosure relates to textile materials and devices that generate electricity using electrostatic energy and, more particularly, to self-powered garments and wearables that generate electricity via omniphobic triboelectric nanogenerators. Methods of manufacturing such textile materials and devices are also provided.

BACKGROUND

The recent miniaturization of electronic systems into wearable devices and interfaces has increased energy consumption in electronic textiles (e-textiles). While conventional e-textiles commonly rely on batteries as a power source, the use of batteries is often uncomfortable to the wearer and requires frequent recharging or replacement of the batteries, which limits usage time and creates a significant barrier to the comprehensive adoption of this emerging technology. To address at least the energy issue, a variety of energy harvesting mechanisms have been proposed to continuously power e-textiles. In recent years, the idea of scavenging ambient energy from the surrounding environment and converting such energy into electronic energy has been explored. For example, flexible photovoltaic systems, photoactive materials, and fibrous perovskite solar cells have been proposed to use sunlight to power e-textiles and smart clothes. Unfortunately, however, environmental limitations such as nighttime, cloudy days, or dimly illuminated rooms can significantly reduce power generation efficiency and continuity, result in frequently hampered e-textile applications.

Thermoelectric effects have also been explored in an effort to continuously power e-textiles. One such approach works by converting thermal gradients in the textile into electric energy. Other flexible pyroelectric generators exploit the pyroelectric effect to harvest energy from temperature fluctuations created due to thermal diffusion. While, at the typical temperature gradients generated between the human body and the environment, thermoelectric generators demonstrate better performance powering e-textiles than pyroelectric materials, it remains extremely difficult to obtain flexible and high-performance thermoelectric materials. To overcome this significant limitation, thermoelectric generators are fabricated to consist of many thermoelectric units connected in series or parallel, which ultimately compromises the flexibility and comfort of the e-textile.

The conversion of biomechanical energy generated during a wearer's natural motion into electrical energy has also been investigated as a potential e-textile power source. For example, exploiting the piezoelectric effect, several textile-shaped piezoelectric materials (such as safe and stable zinc oxide (ZnO) nanowires or polyvinylidene difluoride (PVDF) fibers) can be layered or directly grown onto conductive textile electrodes to fabricate piezoelectric generators. The high-output voltage performance of flexible piezoelectric generators enables their use not only to power wearable and implantable devices, but also as self-powered biosensors capable of monitoring the respiration and arterial pulse of the wearer. Unfortunately, textile-based piezoelectric generators often require complex fabrication processes that are not favorable for continuous production. Additionally, the prolonged exposure of piezoelectric materials and metal wire electrodes to moisture deteriorates the performance of the piezoelectric generators over time, thus limiting their practical utility in e-textile applications.

Triboelectric nanogenerators (TENGs) that leverage the triboelectric effect can harvest ambient mechanical energy and converting it into electrical energy using triboelectrification and electrostatic induction. Indeed, TENGs have had some success as energy harvesters, self-powered sensors, and power sources for low-powered electronics and wearable devices. As compared to other energy harvesting devices, TENGs offer several advantages including they are low cost, reliable, light weight, offer a high power density, and can generate large output power. Furthermore, TENGs are compatible with a wide range of materials and have a relatively simple fabrication process.

However, conventional multi-layered TENGs are fabricated using non-porous film materials and elastomeric encapsulation to protect against environmental moisture, the inclusion of which limits the breathability of the underlying garments. Additionally, the high output voltage produced by multilayered TENGs is frequently achieved by nanotexturing the triboelectric interface where contact electrification occurs, which significantly increases the complexity and production costs of these e-textiles.

Entwining fibers of opposite triboelectric polarities enables the fabrication of flexible textile-based TENGs with high air permeability, but limited stretchability. Recently, coaxial fiber-shaped TENGs—comprising an electropositive core fiber, conducting nanomaterials, and a highly electronegative coating layer—have demonstrated higher stability under continuous bending and stretching than entwined or two-fiber twisted TENGs. However, due to the hygroscopic nature of many textiles, environmental moisture and the sweat of the wearer promote bacterial proliferation, which ultimately compromises the electrical output of textile-based TENGs. The mechanical damage caused by repetitive usage and washing also exacerbates the efficiency of fiber-based TENGs. Furthermore, the radius of the yarn often utilized in textile-based TENGs is greater than the ones used in traditional embroidery, thus making the fibers difficult to manufacture using industrial embroidery systems.

Accordingly, there is a need for improved materials that comprise stretchable, breathable, waterproof, and antibacterial TENGs incorporated into any fiber-based textile that provide a reliable, efficient, and comfortable human-machine interface. Scalable methods of manufacturing such materials are also needed, which should ideally be low cost and facilitate the development of future e-textile applications.

BRIEF SUMMARY

Triboelectric nanogenerators are provided in certain embodiments of the present disclosure. In at least one embodiment, the triboelectric nanogenerator comprises a first electrode layer comprising a first network of conductive nanoparticles, a second electrode layer comprising a second network of conductive nanoparticles and an electronegative layer applied over the second network of conductive nanoparticles, and a component positioned over the first network of conductive nanoparticles of the first electrode layer and defining a contour. The first network of conductive nanoparticles can be arranged on a silanized surface of a first textile substrate (silanized, for example, using one or more organosilane molecules such as fluoroalkylated organosilane), and the second network of conductive nanoparticles can be arranged on a silanized surface of a second textile substrate (silanized, for example, using one or more organosilane molecules such as fluoroalkylated organosilane). In some embodiments, the conductive nanoparticles of one or both of the first and second networks comprise silver nanoflakes.

In at least one embodiment, the first textile substrate can undergo friction with the electronegative layer. The component positioned over the first network of conductive nanoparticles of the first electrode layer can further be coupled with both the first electrode layer and the second electrode layer. Both the first electrode layer and the second electrode layer can be electrically charged by the friction between at least the first textile substrate of the first electrode layer and the electronegative layer of the second electrode layer. Additionally or alternatively, the first and second electrode layers can be electrically charged by friction between one or more fibers of the component itself.

The triboelectric nanogenerator can further comprise one or more electronic devices in electric communication with at least the second electrode layer. In at least one embodiment, at least one of the one or more electronic devices comprises a human machine interface (HMI). The triboelectric generator can, in certain embodiments, further comprise a garment to which the component (coupled with both the first and second electrode layers) is applied.

In certain embodiments, the component comprises embroidery. In certain embodiments, the component comprises an embroidery patch. The contour of the component can be a circumferential contour and, in at least one embodiment, the component can be stitched to both the first electrode layer and the second electrode layer along at least a portion of the contour. In certain embodiments, the first network of conductive nanoparticles of the first electrode layer can define a shape that correlates with an area defined by the contour of the component.

At least one surface of the component can be silanized (silanized, for example, using one or more organosilane molecules such as fluoroalkylated organosilane). In certain embodiments, the electronegative layer comprises polytetrafluoroethylene.

Each of the first and second networks of conductive nanoparticles can comprise a monolayer of conductive nanoparticles.

Electronic textiles are also provided in the present disclosure. In certain embodiments, an electronic textile comprises an article of clothing, at least one triboelectric generator coupled with the article of clothing, and one or more electronic devices in electric communication with the at least one triboelectric generator. The triboelectric generator can comprise any triboelectric generator provided in this disclosure. For example, and without limitation, the triboelectric can comprise a first electrode layer comprising a first network of conductive nanoparticles arranged on a silanized surface of a first textile substrate; a second electrode layer comprising a second network of conductive nanoparticles arranged on a silanized surface of a second textile substrate and an electronegative layer applied over the second network of conductive nanoparticles, the first textile substrate able to undergo friction with the electronegative layer; and a component positioned over the first network of conductive nanoparticles of the first electrode layer and defining a contour, the component coupled with both the first electrode layer and the second electrode layer. There, both the first electrode layer and the second electrode layer can be electrically charged by the friction between the first textile substrate of the first electrode layer and the electronegative layer of the second electrode layer. Additionally, the one or more electronic devices can each be in electric communication with at least the first electrode layer of the at least one triboelectric generator. In certain embodiments, the at least one triboelectric generator can be affixed to the article of clothing in a location conducive to a wearer manipulating the component thereof upon movement or touch. The electronic textile can, in certain embodiments, further comprise at least one HMI in electric communication with at least one of the one or more electronic devices.

Methods of manufacturing a triboelectric nanogenerator are also provided. In at least one embodiment, such methods comprise: assembling a first electrode by rendering at least a first surface of a first textile substrate omniphobic through silanization, applying a plurality of conductive nanoparticles in a monolayer to the omniphobic surface of the first textile substrate to form a first electrode layer thereon, and positioning a component over the first electrode layer; assembling a second electrode by rendering at least a first surface of a second textile substrate omniphobic through silanization, applying a plurality of conductive nanoparticles in a monolayer to the omniphobic surface of the second textile substrate to form a second electrode layer thereon, and applying an electronegative layer over the second electrode layer; and affixing the first and second electrodes together along at least a circumferential contour of the component such that the first textile substrate of the first electrode is able to undergo friction with the electronegative layer of the second electrode and both the first and second electrode layers are able to be electrically charged by the friction between the first textile substrate of the first electrode and the electronegative layer of the second electrode.

The rendering step of the method can, in at least one embodiment, comprise spraying at least the first surface of the first textile substrate with a silanizing coating composition comprising at least one fluoroalkylated organosilane. Additionally or alternatively, the conductive nanoparticles can comprise silver nanoflakes (AgNFs). In at least one such embodiment, the step of applying a plurality of conductive nanoparticles in a monolayer to the omniphobic surface of the first textile substrate further comprises spraying a suspension of AgNFs through a stencil to define a shape of the first electrode layer, wherein the shape correlates with an area defined by the circumferential contour of the component.

Certain embodiments of the method further comprise rendering at least a top surface of the component omniphobic through silanization; and coupling the triboelectric generator to an article of clothing in a location conducive to a wearer of the clothing manipulating the component upon movement or touch. In certain embodiments, the method can further comprise electrically coupling at least one electronic device to at least the second electrode via one or more conductive wires or threads embedded in the component (or other materials of the triboelectric generator). In certain embodiments, one or more of the rendering and applying steps is performed using spray deposition.

BRIEF DESCRIPTION OF THE DRAWINGS

The disclosed embodiments and other features, advantages, and aspects contained herein, and the matter of attaining them, will become apparent in light of the following detailed description of various exemplary embodiments of the present disclosure. Such detailed description will be better understood when taken in conjunction with the accompanying drawings, wherein.

Figure 2:
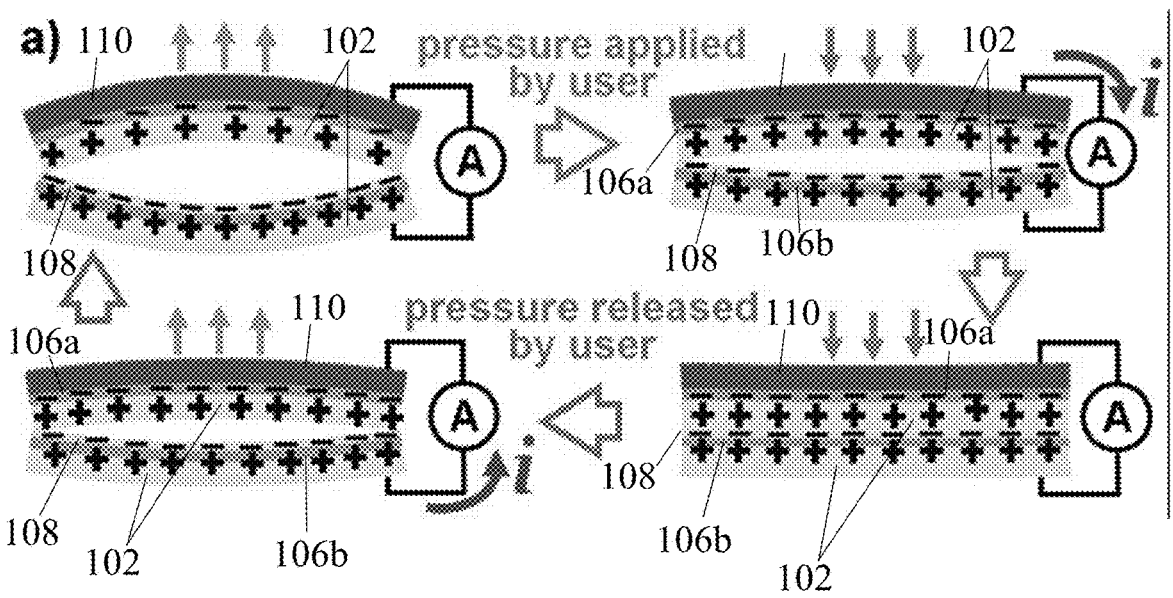
FIG. 2 illustrates the production of electric energy and bacteria repellency of the omniphobic e-textiles powered by $R^F$-TENGs of the present disclosure, with subpart (a) showing schematics of the charge generation process in a $R^F$-TENG; subpart (b) showing photographs of a $R^F$-TENG e-textile of the present disclosure having a shape of a cat and powering two LEDs embroidered as eyes; subpart (c) showing photographs of a $R^F$-TENG e-textile of the present disclosure operating while being covered with several droplets of blue-dyed water (circles); and subpart (d) showing photographs of a $R^F$-TENG e-textile of the present disclosure harvesting biomechanical energy by bending and stretching the $R^F$-TENGs (LEDs are on in all pictures of subpart (d))
Figure 2:
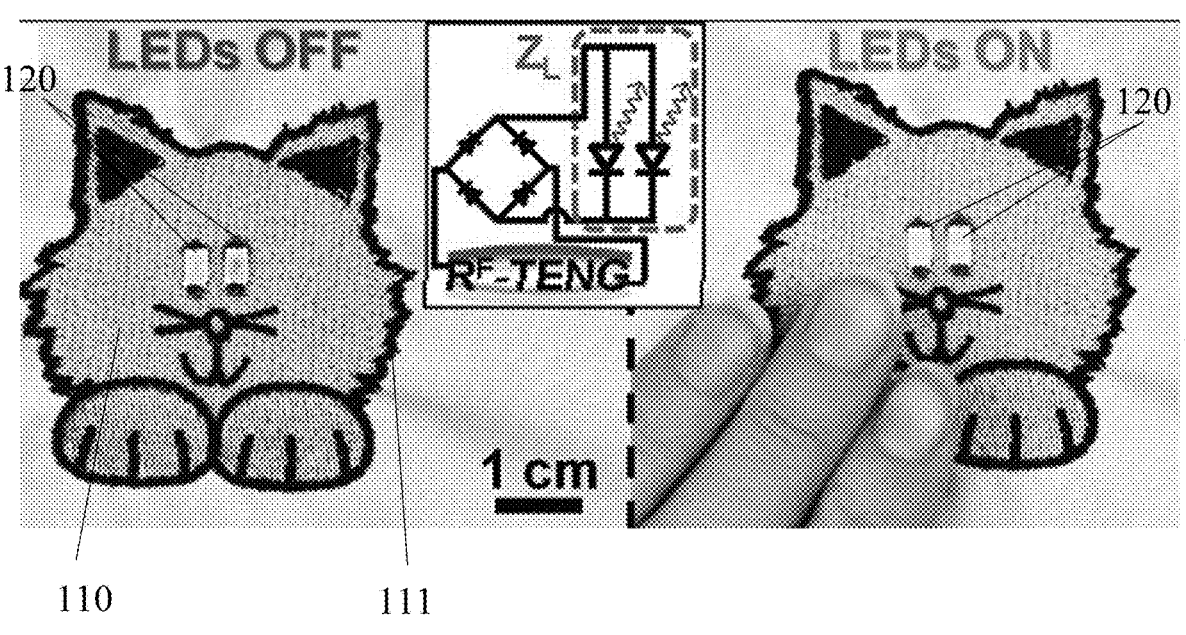
Figure 7:
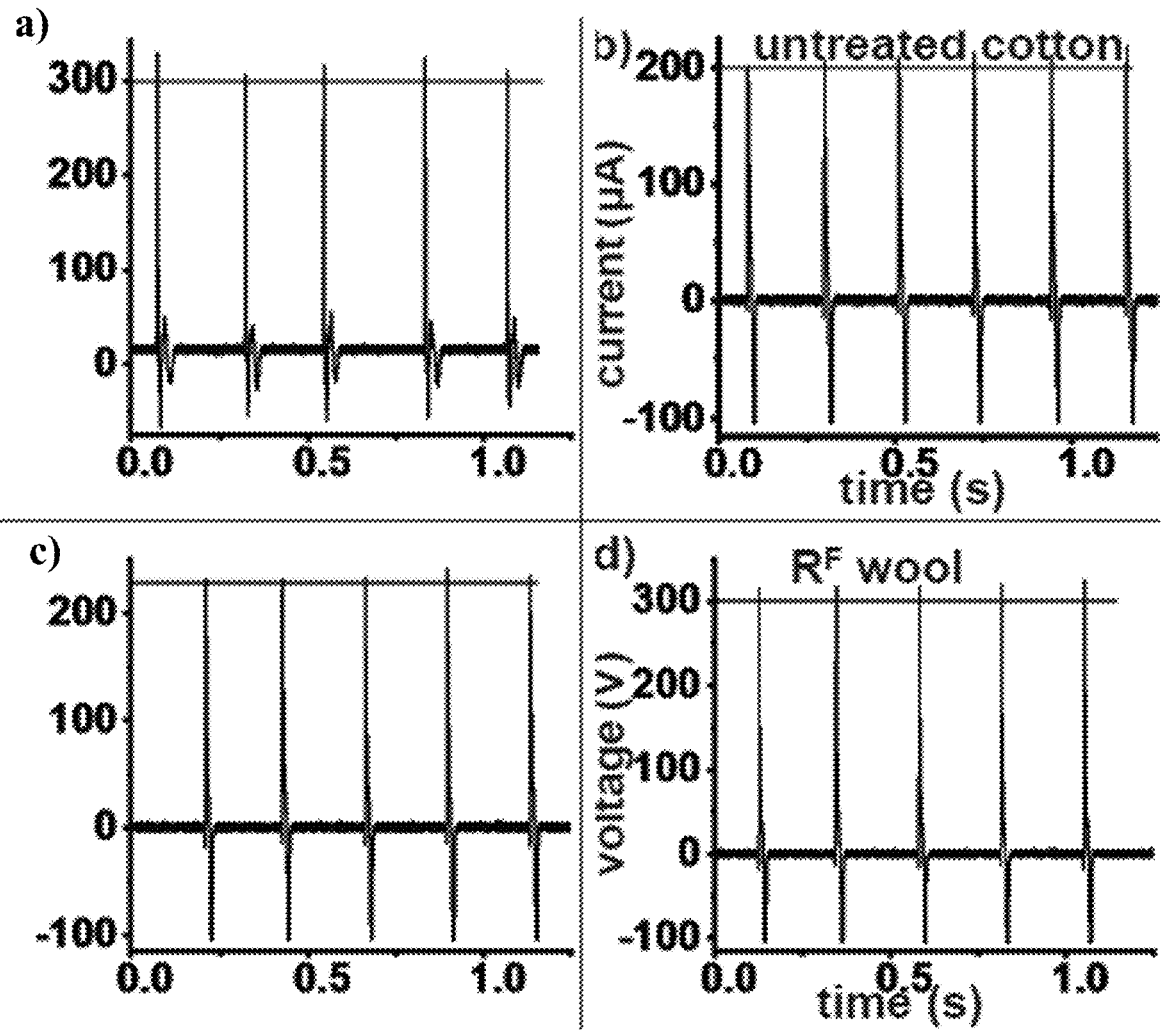
Figure 8:
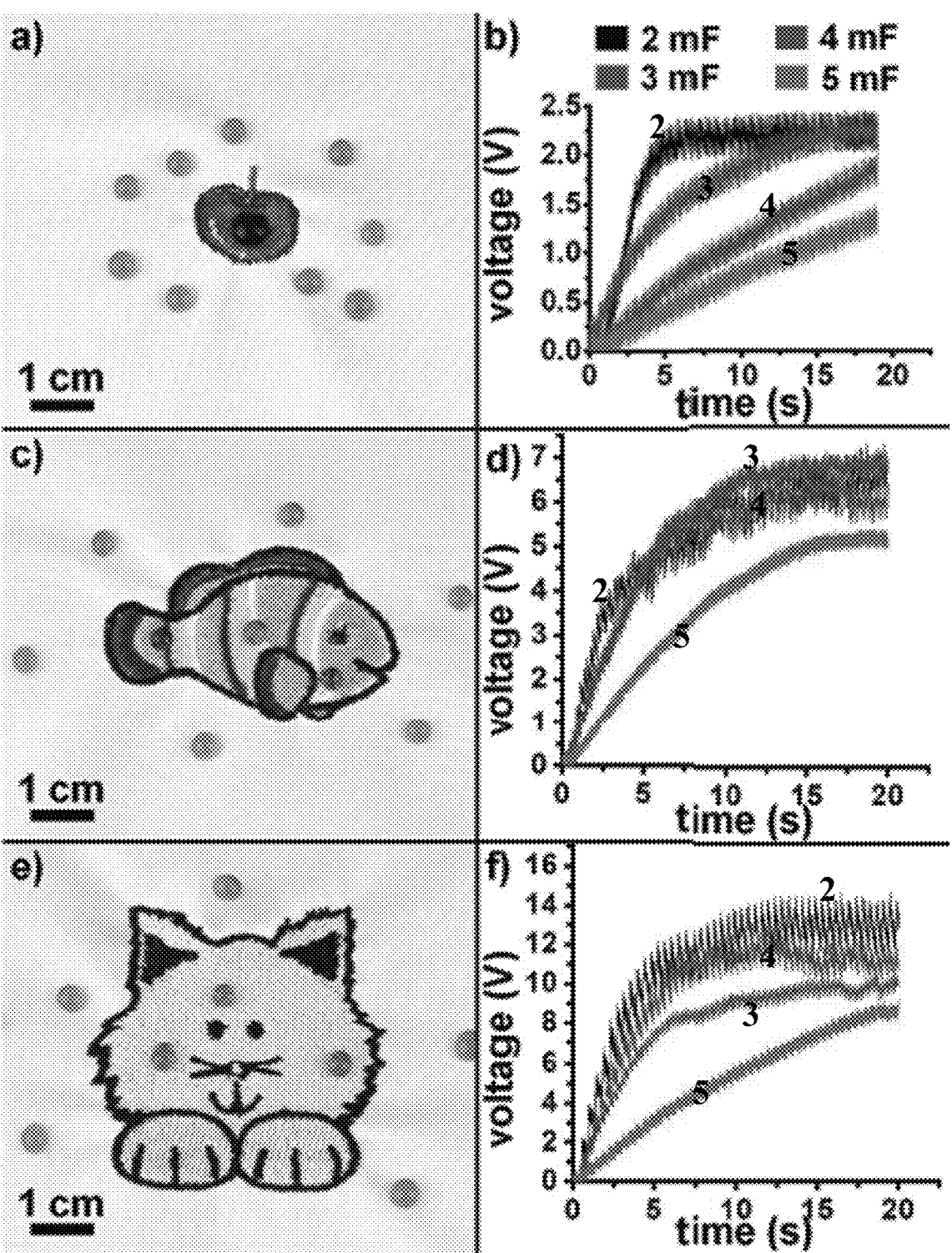
Figure 9:
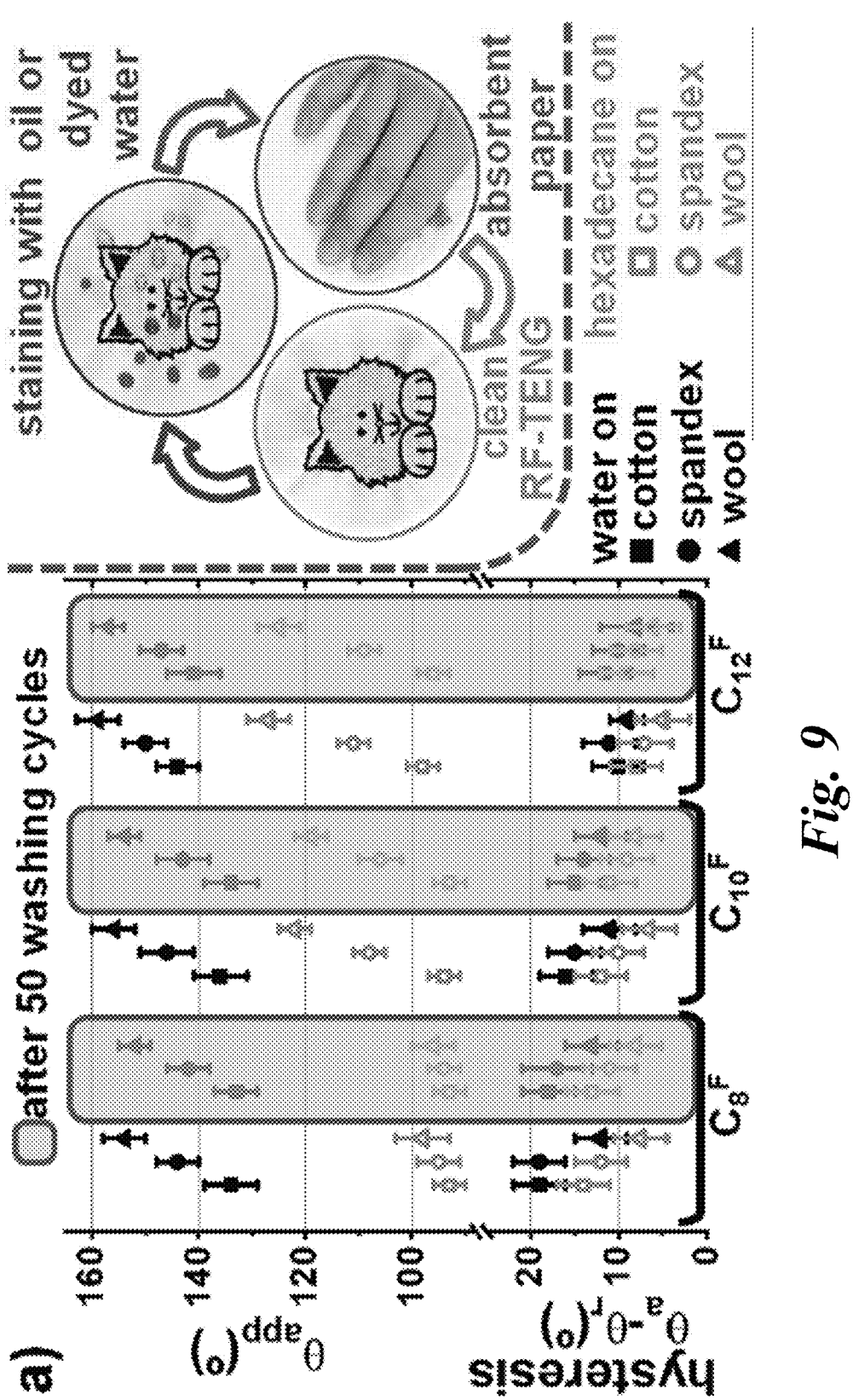
Figure 10:
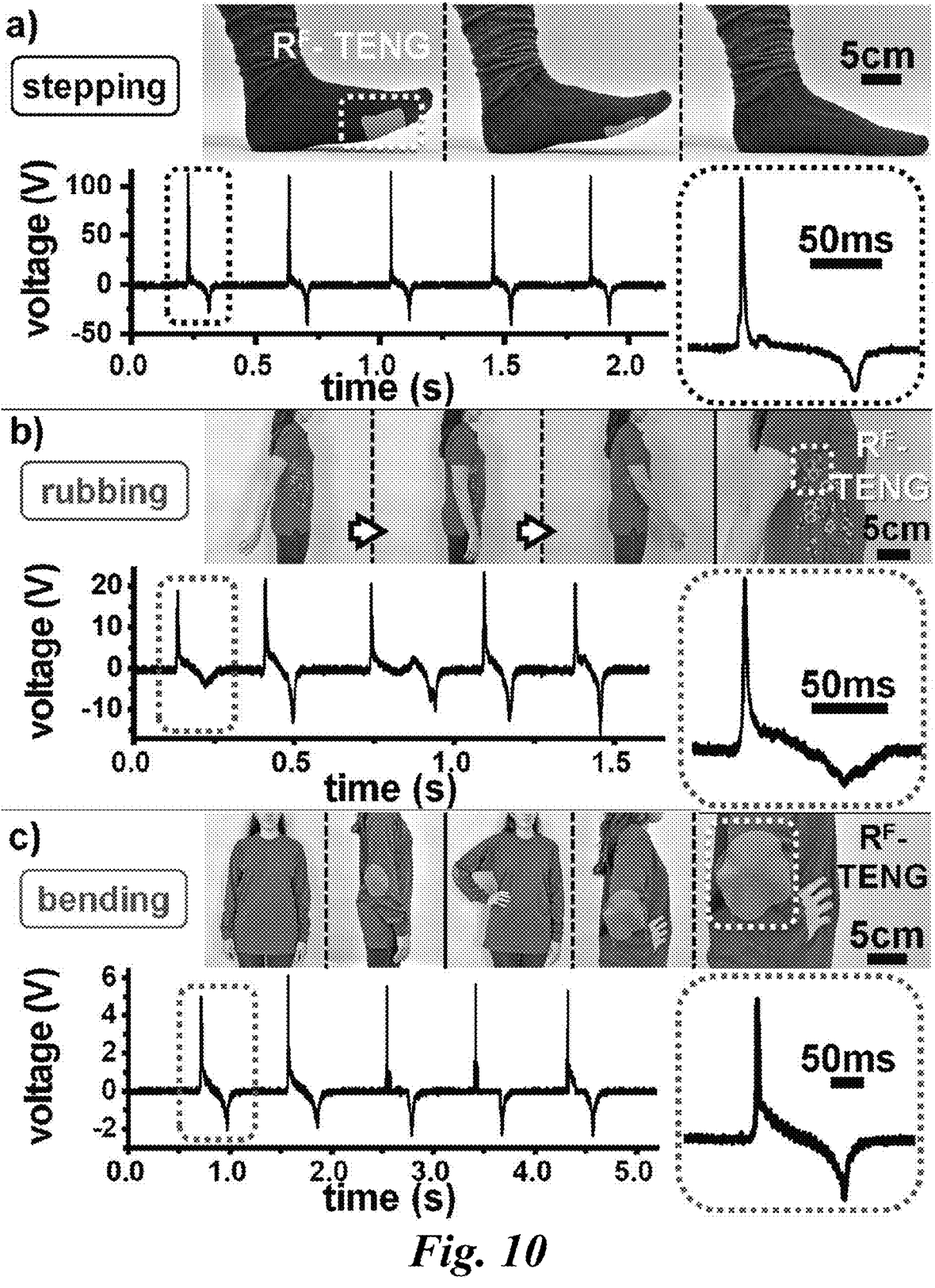
Figure 11:
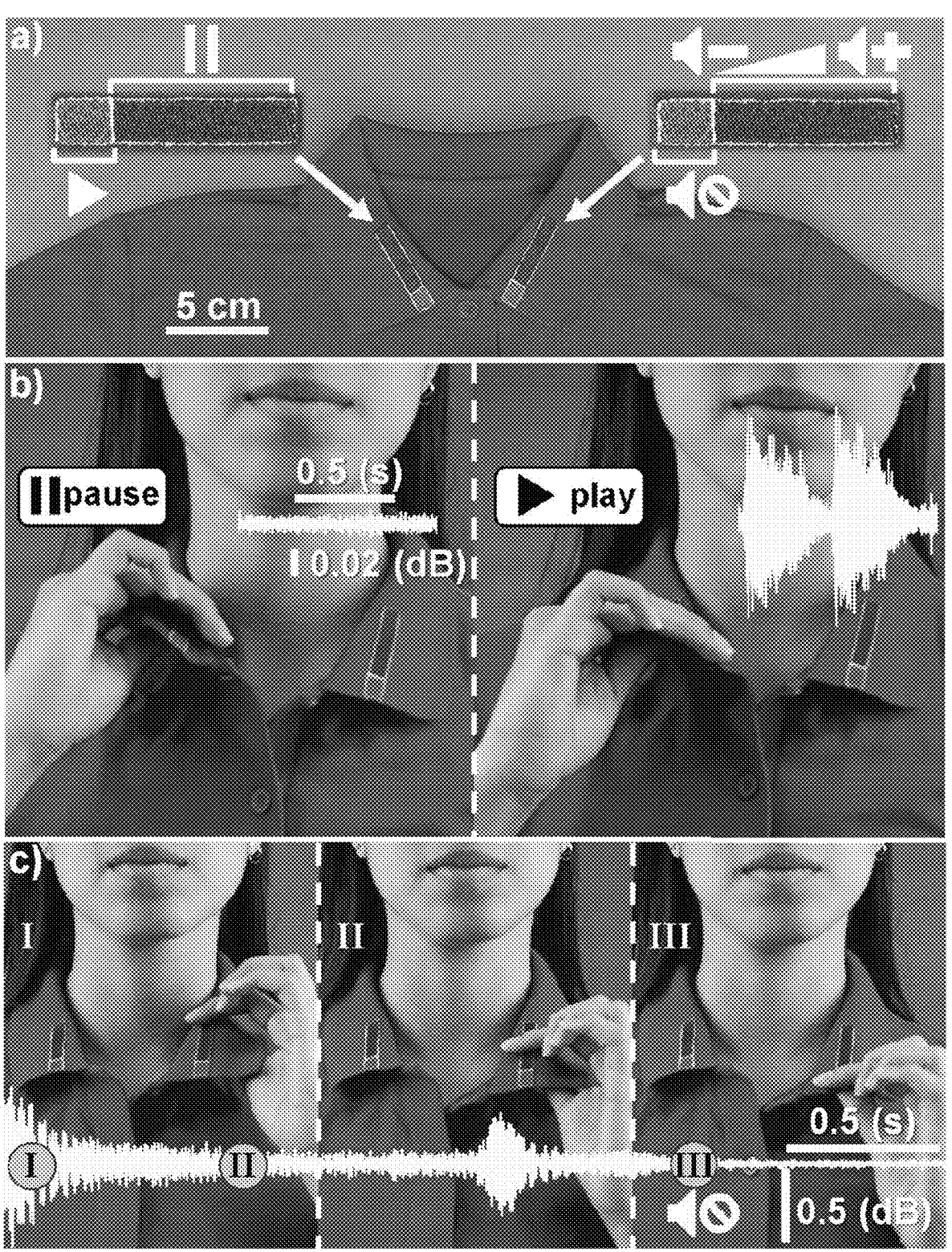
Figure 12:
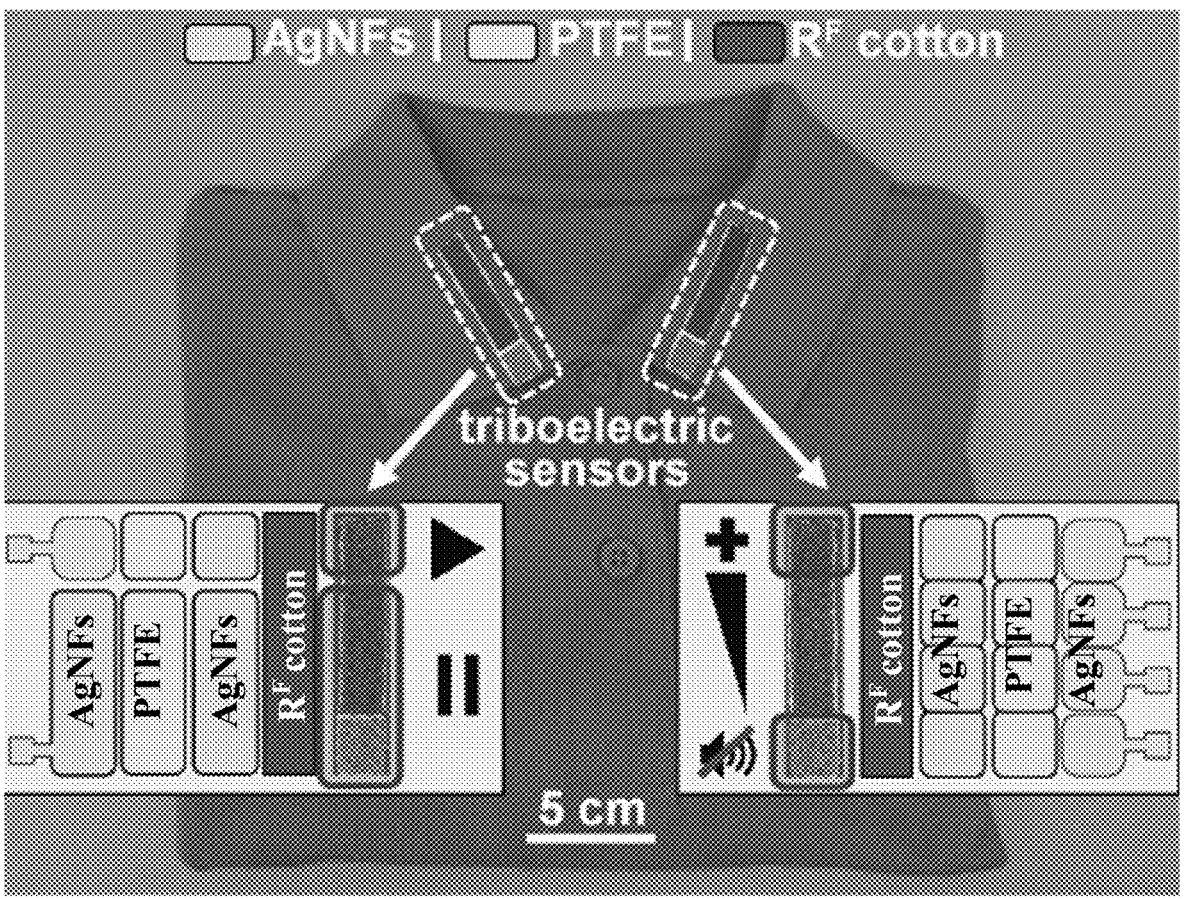

Hz; subpart (b) showing open-circuit voltage peaks rectified using the circuit shown in FIG. 2, subpart (c); subpart (c) showing short-circuit current peaks (before rectification) generated by tapping the $R^F$-TENG with two fingers at ~4 Hz; subpart (d) showing short-circuit current peaks after rectification; subpart (e) showing dependence of the output voltage and the output current on the external load; and subpart (f) showing dependence of the output power density on the external load;

FIG. 7 shows voltage peaks generated by tapping $R^F$-TENG (area ~6.25 cm$^2$) made with different fabrics, with subpart (a) showing silanized cotton; subpart (b) showing untreated cotton; subpart (c) showing silanized spandex; and subpart (d) showing silanized wool;

FIG. 8 shows data relating to studies on the production and storage of electric energy using different $R^F$-TENG sizes and capacitors with different capacitances, with subpart (a) showing an electronic textile ($R^F$-TENG) according to the present disclosure with a cherry design of area 2.25 cm$^2$; subpart (b) showing charging curves of different capacitors, produced by tapping the $R^F$-TENG of subpart (a) at ~4 Hz; subpart (c) showing an electronic textile according to the present disclosure having a fish design of area 4.5 cm$^2$; subpart (d) showing charging curves of different capacitors, produced by tapping the $R^F$-TENG in subpart (c) at ~4 Hz; subpart (e) showing an electronic textile according to the present disclosure having a cat of area 6.25 cm$^2$; and subpart (f) showing charging curves of different capacitors, produced by tapping the $R^F$-TENG in subpart (e) at ~4 Hz;

FIG. 9 illustrates data resulting from washing durability experiments, with subpart (a) showing graphical data representative of comparison of the apparent static contact angle $\theta_{app}$ and the contact angle hysteresis ($\theta_a - \theta_r$) of water and hexadecane on three textiles (cotton, spandex, and wool) with different functionalizations ($C_8^F$, $C_{10}^F$, and $C_{12}^F$) before and after 50 cycles of standard machine washing, with the inset showing the stain repellency of the omniphobic textiles to hexadecane and dyed water, which can be cleaned by bringing them into contact with an absorbent paper towel; subpart (b) showing data related to charging curves of a 2 mF capacitor embedded in cotton-based $R^F$-TENGs of different sizes (I—cherry design ~2.25 cm$^2$; II—fish design ~4.5 cm$^2$; III—cat design ~6.25 cm$^2$; scale bars 2 cm), before and after 50 cycles of washing ($V_{cap}$ indicating the voltage at the capacitor after 18 sec of tapping); and subpart (c) showing graphical data related to measures of the $\theta_{app}^{H_2O}$, the open-circuit voltage, and the short-circuit current of the $R^F$-TENGs shown in FIG. 9, subpart (b), before and after 50 cycles of washing;

FIG. 10 shows data related to biomechanical energy harvesting using $R^F$-TENGs e-textiles according to the present disclosure, with subpart (a) showing output voltage data generated by one $R^F$-TENG embroidered on the bottom of a sock during walking; subpart (b) showing output voltage data generated by rubbing the arm against the surface of an $R^F$-TENG embroidered on the side of a polo shirt; and subpart (c) showing output voltage data generated aby an $R^F$-TENG elbow patch upon repetitive bending of the elbow;

FIG. 11 shows photographs of a self-powered audio control interface based on $R^F$-TENGs according to the present disclosure, with subpart (a) showing $R^F$-TENG-based controllers embroidered on the polo shirt shown in FIG. 11, subpart (b); subpart (b) illustrating that double-tapping on the top part of the right controller pauses the music playback and double-tapping its bottom part resumes the music playback; and subpart (c) illustrating that dragging a finger down from the top part of the left controller gradually lowers the music volume and, eventually, all of the way to mute; and FIG. 12 shows a photograph of the shirt of FIG. 11 along with layers of audio control interface schematics.

While the present disclosure is susceptible to various modifications and alternative forms, exemplary embodiments thereof are shown by way of example in the drawings and are herein described in detail.

DETAILED DESCRIPTION

For the purposes of promoting an understanding of the principles of the present disclosure, reference will now be made to the embodiments illustrated in the drawings and specific language will be used to describe the same. It will nevertheless be understood that no limitation of scope is intended by the description of these embodiments. On the contrary, this disclosure is intended to cover alternatives, modifications, and equivalents as may be included within the spirit and scope of this application as defined by the appended claims. As previously noted, while this technology may be illustrated and described in one or more preferred embodiments, the compositions, systems, and methods hereof may comprise many different configurations, forms, materials, and accessories.

In the following description, numerous specific details are set forth to provide a thorough understanding of the present disclosure. Particular examples may be implemented without some or all of these specific details and it is to be understood that this disclosure is not limited to particular biological systems, which can, of course, vary.

The materials of the present disclosure are self-powered, triboelectric e-textiles. These e-textiles harvest the biomechanical energy of a wearer using omniphobic triboelectric nanogenerators (R$^F$-TENGs) positioned on the surfaces of textile substrates by, for example, combining embroidery with the spray-deposition of conductive nanoparticles, an electronegative layer (e.g., comprised of polytetrafluoroethylene (PTFE)), and fluoroalkylated organosilanes. As used herein, "omniphobic" means both hydrophobic and oleophobic such that it is both fluid resistant and oil resistant. The terms "fluid resistant" is used herein to describe the resistance of a textile substrate to penetration by a fluid such that the textile substrate is essentially impermeable to fluids, such as water. In other words, a textile substrate treated to be fluid resistant can support a considerable column of water without water penetration through the textile substrate.

In certain embodiments, each triboelectric nanogenerator is a wearable, two-part structure comprising a first electrode layer affixed to a first textile substrate and a second electrode layer affixed to a second textile substrate, each layer comprising a plurality of conductive nanoparticles. The conductive nanoparticles can, for example, be a plurality of silver nanoflake electrodes (AgNFs) or other conductive nanoflake or nanotube electrodes arranged in one or more networks on the surface(s) of the textile.

The self-powered e-textile materials based on R$^F$-TENGs of the present disclosure are flexible, stretchable, breathable, and effectively repel water, stains, and bacterial proliferation. Clothing and other wearables fabricated from this inventive e-textile allows the wearer to achieve greater functionality and comfort from the clothing. As used herein, a "wearable" is a mobile electronic device that can be worn by or otherwise affixed to a user (as opposed to a device that is carried by hand (i.e. a hand-held device)). The power output of these novel e-textiles also remains stable after repeated mechanical deformations and standard machine-washing tests. Furthermore, the high-touch sensitivity exhibited by the R$^F$-TENGs-based e-textiles and their compatibility with large-scale production processes allows for cost-effective fabrication of robust and superior e-textiles for emerging human-machine interface applications.

Figure 1:
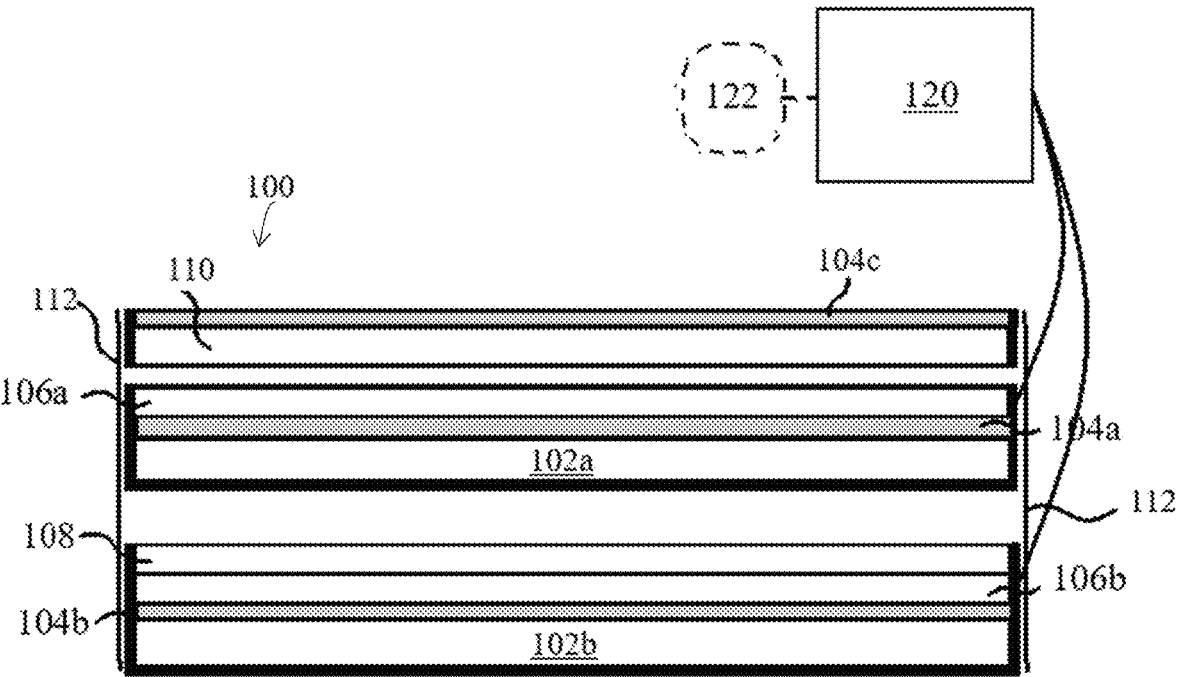
FIG. 1 shows a cross-sectional view of an e-textile comprising triboelectric nanogenerators ($R^F$-TENGs) according to an exemplary embodiment of the present disclosure.

Now referring to FIG. 1, at least one embodiment of a triboelectric nanogenerator (R$^F$-TENG) 100 is shown. R$^F$-TENG 100 comprises a first electrode layer 106a comprising a first network of conductive nanoparticles arranged on a first textile sub state 102a, a second electrode layer 106b comprising a second network of conductive nanoparticles arranged on a second textile substrate 102b and coated in an electronegative substance (e.g., PTFE), and an component 110 (e.g., an embroidery patch) positioned over the first network of conductive nanoparticles of the first electrode layer 106a, wherein the first electrode layer 106a is positioned between the component 110 and the second electrode layer 106b and the first and second electrode layers 106a, 106b. In at least one embodiment, the component 110 can be sewn, stitched, or otherwise affixed around at least a portion of its circumferential contour 111 (see FIG. 2, subpart (b)) to both the first and second electrode layers 106a, 106b. As such, only the edges of each of electrode layers 106a, 106b are affixed such that the first textile substrate 102a is able to undergo friction with the electronegative layer such that both the first and second electrode layers 106a, 106b can be electrically charged by such resulting friction.

The textile substrates 102a, 102b can comprise any textile now known or hereinafter developed. As used herein, a "textile" or a "textile substrate" is any woven or non-woven textile material suitable for use in connection with the coatings, R$^F$-TENGs, and/or methods of the present disclosure. For example, a textile can be a flexible material made by creating an interlocking network of yarns, threads, and/or other fibers. Textiles can be formed by weaving, knitting, crocheting, tatting, knotting, felting, bonding, or braiding the yarns together and/or can be comprised of natural or synthetic fibers. Examples of natural fibers include plant fibers such as cotton, cellulose, flax, and hemp as well as animal-derived fibers such as wool and silk. Example synthetic materials include polymeric and non-polymeric materials such as polyolefins (e.g., polyethylene and polypropylene) and halogenated polymers such as polyvinylchloride. Additional examples of synthetics include those materials used in fibers and fabrics such as rayon, nylon, acrylic, polyester, aramid, carbon fiber and glass fiber. A textile and/or fabric can be woven in a single-layer weave and/or in a plural-layer weave.

In at least one embodiment, at least the second textile substrate 102b is a textile or fabric already fabricated into a garment. For example, a conventional garment can be used as the second textile substrate 102b for fabricating the e-textiles described herein such that an existing piece of clothing can be "retrofit" with the R$^F$-TENGs hereof and, thus, transformed into an e-textile capable of powering one or more electronic devices. Alternatively, one or both of the first and second textile substrates 102a, 102b can be a cloth, fabric or other textile starting material that is a beginning component for subsequent fabrication into an item of clothing or other wearables. It will be appreciated that the first and second textile substrates 102a, 102b need not be the same type of textile. For example, and without limitation, the first textile substrate 102a can be a fabric or natural fiber-based cloth and the second textile substrate 102b can be a piece of synthetic material such as spandex, lycra, or elastane (or vice versa).

In at least one exemplary embodiment, the surface of each textile substrate 102a, 102b is omniphobic. Imparting omniphobic properties to the textile substrates 102a, 102b can be achieved through inclusion of a layer 104a of a silanizing coating composition to one or more surfaces of the first textile substrate 102a and a layer 104b of the silanizing coating composition to one or more surfaces of the second textile substrate 102b.

Fluorinated materials are known to repel the adhesion of bacterial pathogens (e.g., C. albicans, P. aeruginosa, and E. coli). Accordingly, where a fluorinated organosilane is employed, it will also have the added benefit of inhibiting the growth of microbes on the resulting $R^F$-TENG 100.

The silanizing coating compositions hereof can comprise organosilane molecules such as fluorinated organosilane, fluoroalkylated organosilanes (e.g., trichloro(3,3,4,4,5,5,6,6,7,7,8,8,9,9,10,10,11,11,12,12,12-henicosafluorododecyl) silane ($CF_3(CF_2)_9CH_2$—$CH_2SiCl_3$; "$C_{12}^F$") or octadecyl-trichlorosilane "ODTS") or any other organofunctional alkoxysilanes or organosilicon chemicals. In at least one embodiment, the silanizing coating composition comprises a 4.76% v/v solution of a fluoroalkylated organosilane in isopropanol.

The silanizing coating compositions used herein can further comprise one or more antimicrobial agents and/or additional hydrophobic coatings to further minimize and/or eliminate the growth of microorganisms on the textiles which can negatively affect the wearer and the textile. As used herein, "antimicrobial agent" means any substance or combination of substances that kills or prevents the growth of a microorganism, and includes antibiotics, antifungal, antiviral and antialgal agents.

"Coating composition" generally refers to a composition comprised of a coating agent as described herein. The coating composition can contain components in addition to the active agents described (i.e. with respect to the silanizing coating composition, the silanization agents) such as, for example, binders, colorants, etc. The use of the term "coating" in the phrase "coating composition" is not limited to the presence of the composition on a surface of the textile substrate 102a, 102b, but also encompasses a textile substrate 102a, 102b that has been infiltrated with the composition such that the composition is present within the fibers of the treated substrate. Unless specifically indicated otherwise, "coating" in reference to the coating compositions and coating agents described herein is only used as a term of convenience and is not limiting as to the manner of application of the compositions hereof or to their final location on and/or within a treated textile substrate 102a, 102b.

Adjacent to each layer 104a, 104b of silanizing coating composition, the $R^F$-TENG 100 further comprises electrode layers 106a, 106b. Perhaps more specifically, as shown in FIG. 1, a first electrode layer 106a is applied to the silanized surface (layer 104a) of the first textile substrate 102a and a second electrode layer 106b is applied to the silanized surface (layer 104b) of the second textile substrate 102b.

Each of the electrode layers 106a, 106b comprise a plurality of conductive nanoparticles arranged in a network on the respective silanized surfaces (layers 104a, 104b) of the textile substrates 102a, 102b. The conductive electrodes can comprise any type of conductive nanoparticle, nanoflake (NF), or nanotube now known or hereinafter developed that is conductive and capable of application in a thin film or layer to the textile substrates 102a, 102b. For example, and without limitation, the conductive nanoparticles can be silver nanoparticles, AgNFs, or carbon nanoflakes.

The conductive nanoparticles of each electrode layer 106a, 106b can be applied in a monolayer, a multi-layer, and/or a thin film as desired, ideally oriented parallel to the respective layers 104a, 104b, with the nanoparticles overlapping to achieve electronic conductivity by percolation. In at least one embodiment, such conductive nanoparticles can be applied via solution-based techniques, such as spin-coating, spraying, and printing. For example, a 5 wt. % suspension of silver nanoflakes (AgNFs) in toluene can be sprayed on the silanized surfaces 104a, 104b to create the first and second electrode layers 106a, 106b. As used herein and unless otherwise specified, "wt. %" or "weight percent" refers to, with respect to the components of the compositions of the present disclosure, the total weight (i.e. the "wet weight") of the components of the compositions hereof and not to the weight percents of the solids or polymers (i.e. the "dry weight") in the components hereof.

The electrode layers 106a, 106b can be sprayed in a particular shape or pattern on the respective layers 104a, 104b (e.g., through a laser cut stencil mask). In at least one exemplary embodiment, only the first electrode layer 106a is sprayed in a particular shape or pattern, while the second electrode layer 106b is not restricted to a particular shape or pattern.

Due to the monolayered NF network of certain embodiments, the electrode layers 106a, 106b can accommodate the characteristics of the underlying substrate 102a, 102b. For example, where the underlying textile substrate 102a, 102b is a stretchy and/or flexible material such as spandex, elastic or the like, when the underlying textile substrate 102a, 120b is stretched, the electrode layer 106a, 106b adhered thereto can also stretch/flex. In fact, such stretching and/or flexion can be used to generate a charge and, thus, harvest mechanical energy from the wearer as described in more detail below.

$R^F$-TENG 100 further comprises a layer (electronegative layer 108) of any electronegative material or substance now known or hereinafter developed (e.g., PTFE, Acetal, Garolite G-10, and/or polyvinyl chloride) positioned on or over the second electrode layer 106b. In at least one embodiment, an electronegative layer 108 encapsulates the second electrode layer 106b. The thickness of the electronegative layer 108 can vary as desired. The electronegative layer 108 can be applied as a coating composition. In at least one embodiment, the coating composition of PTFE comprises a 20% v/v solution of PTFE-N UV in N-Ethyl-2-Pyrrolidone. It will be appreciated that various PTFE and similar functioning solutions can be employed in connection with the $R^F$-TENG 100 hereof.

Additionally, a component 110 is positioned over and/or adjacent to the first network of conductive nanoparticles of the first electrode layer 106a. The component 110 can be, for example, a pattern or an applique embroidered onto a patch or other substrate (e.g., a fabric having one or more layers and comprising an adhesive layer). Alternatively, the component 110 can be embroidered directly to the first textile substrate 102a. Such embroidery can be stock (e.g., purchased at a store) or custom made.

The component 110 can comprise a single or multiple colors, comprise raised patterns of different heights to facilitate tactile perception, and/or can be formed of one or more types of threads or other fibers. Where a commercial embroidery machine is employed (e.g., EverSewn Hero; EverSewn, Inc.), the embroidery process can be automatic; for example, such machines can include a USB port to import any customized embroidery design with different sizes up to 110×170 mm. There, a user need only change the color of the thread whenever advised by the machine.

In at least one exemplary embodiment, the surface of the component 110 is, or is rendered, omniphobic. Similar to the textile substrates 102a, 102b, in at least one embodiment, a layer 104c of the silanizing coating compositions described herein can be applied to one or more surfaces of the component 110. For example, the silanizing layer 104c can be applied to the top surface (i.e. outward facing surface) of the component 110.

The component 110 defines an outline of its shape, which is also referred to herein as the contour 111 (e.g., circumferential contour) of the component 110. The component 110 is fully customizable and can comprise any pattern. Further, the component 110 can be any shape. Previously fabricated embroidery components 110 can be utilized in the R$^F$-TENG 100, or specific embroidery components 110 can be fabricated in connection with the manufacture of specific e-textiles 100.

In at least one exemplary embodiment, the first network of the conductive nanoflakes of the first electrode layer 106a defines a shape that correlates with an area defined by the contour 111 of the component 110. In this manner, when the component 110 is applied to and/or positioned over the first electrode layer 106a, the majority or all the conductive nanoflakes of the first electrode layer 106a are positioned beneath the component 110.

To assemble the R$^F$-TENG 100, the first electrode layer 106a is positioned between the component 110 and the second electrode layer 106b as shown in FIG. 1, with the first and second electrode layers 106a, 106b arranged such that the first textile substrate 102a can undergo friction with electronegative layer 108 (and vice versa).

In at least one embodiment, the component 110 is coupled with both the first and second electrode layers 106a, 106b. For example, the component 110 can be stitched (e.g. via stitches 112) to both the first and second electrode layers 106a, 106b along at least a portion of the contour 111 of the component 110. In at least one embodiment, such stitches can comprise a running stitch outlining the shape of the component 110 and affix at least the outer edges of the component 110 to both the first and second electrode layers 106a, 106b.

The omniphobic electronic textiles 100 hereof operate in contact-separation mode, generating triboelectric energy when motion of the wearer manipulates (e.g., through compression, bending, tapping, rubbing, handling, pressing, folding, stretching, stepping on, etc.) the R$^F$-TENG 100 (see FIG. 2, subpart (a)). The relative sliding of the omniphobic first textile substrate 102a of the first electrode over the electronegative layer 108 (e.g., coating) of the second electrode leads to the generation of charges. Since PTFE and many other electronegative substances are lower in the triboelectric series than most textiles, the electronegative layer 108 accumulates the negative charges generated, while the positive charges concentrate on the textile side (102a) of the R$^F$-TENG 100. Manipulation of the R$^F$-TENG 100 during wear also promotes friction among the omniphobic fibers of the textile substrates 102a, 102b, which also generates additional charges that increase the voltage difference between the first and second electrode layers 106a, 106b (see FIG. 2, subpart (e)). The voltage peaks generated by the R$^F$-TENG 100 can be easily rectified and used to power one or more electronic devices 120 in electric (e.g., conductive) communication with the R$^F$-TENG 100. For example, in at least one embodiment, the electronic devices 120 can be miniaturized electronic components connected using conductive textile threads and embedded into the R$^F$-TENG 100 during the embroidery process (see FIG. 2, subpart (c)). Further, the omniphobic surfaces of the R$^F$-TENG 100 render them insensitive to environmental moisture (see FIG. 2, subpart (d)), which protects the embedded electrodes from corrosion by washing, sweat, and other moisture risks.

One or more electronic devices 120 can be embedded within or otherwise electrically coupled with the R$^F$-TENG 100 to benefit from the electrical output generated by the R$^F$-TENG 100. In at least one embodiment, an electrical device 120 is in electrical communication with both the first and second electrode layers 106a, 106b (e.g., via one or more conductive wires, textile threads or the like and/or embedded in the R$^F$-TENG 100). The electrical device 120 can comprise any electrical device now known or hereinafter developed that can be powered by the voltage generated from the R$^F$-TENG 100 including, by way of non-limiting example, a light-emitting diode (LED), a cascade of transistors, a capacitive sensor, a miniaturized electronic device, a microchip, and/or wearable technology such as a wearable audio device, a wearable tracking device, a wearable medical device, a wearable fitness device, etc. In at least one embodiment, the component 110 comprises one or more conductive wires or threads embedded therein to facilitate electrical coupling with the one or more electrical devices 120.

R$^F$-TENGs 100 can be applied to a garment or wearable, and thus convert it to an electronic textile, to supply power to the one or more electronic devices 120 in electric communication therewith. Where the second textile substrate 102b does not comprise a pre-fabricated garment and the R$^F$-TENG 100 is an independent patch, for example, the R$^F$-TENG 100 can be sewn, adhered, or otherwise coupled with a garment or a wearable. The placement of the R$^F$-TENG 100 on the garment or other wearable can be dependent on the desired application and can be in any area provided the R$^F$-TENG 100 is accessible for manipulation. In at least one embodiment, the R$^F$-TENG 100 is positioned on a shirt in the vicinity of the underarm such that, when worn, the R$^F$-TENG 100 is manipulated with each arm swing of the wearer, or at another joint (e.g., the elbow or knee) such that flexion of the wearer's joint manipulates the R$^F$-TENG 100. Similarly, the R$^F$-TENG 100 can be positioned at or near the sole of a shoe or socks such that the e-textile is manipulated upon each footfall of the wearer. Alternatively, the R$^F$-TENG 100 can be positioned on a garment or other wearable in a location that is easy for a user to access and/or touch with his or her fingers (e.g., at or near a collar, collar bone area, and/or a cuff of a shirt, a waistband of shorts or pants, at or near a breast pocket of a shirt or pockets of shorts or pants, etc.). Furthermore, multiple e-textiles 100 can be applied to a single garment or wearable as is appropriate for the desired application(s).

Where an R$^F$-TENG 100 is positioned on a garment or other wearable, it will be understood that the one or more electronic devices 120 in electrical communication therewith can be positioned at or near the R$^F$-TENG 100 or at a different location on the garment or wearable. For example, the one or more electronic devices 120 can be embedded within the R$^F$-TENG 100 itself and, where appropriate, could obtain some form of protection of at least the omniphobic component 110 when positioned thereunder.

In at least one exemplary embodiment, an electronic device 120 further comprises and/or is in electronic communication with a human machine interface (HMI) 122. The HMI 122 can be any component that facilitates a user's use and/or interaction with the electronic device 120. In at least one embodiment, the HMI 122 is configured to transduce human touch or movement into computer inputs. The HMI 122 can comprise an array or mesh of electroconductive fibers, threads, or yarns that are woven together or otherwise integrated into the fabric of an article of clothing or clothing accessory. In at least one exemplary embodiment, the HMI 122 is unobtrusively integrated into smart clothing (i.e. a garment comprising the $R^F$-TENG 100 affixed thereto or otherwise integrated therewith). There are numerous examples of HMIs 122 known in the art and it will be understood that any such HMI 122 can be utilized in connection with the electronic device(s) 120 and $R^F$-TENG 100 hereof.

Methods for manufacturing a $R^F$-TENG 100 are provided. Other methods are provided for manufacturing an e-textile comprising one or more $R^F$-TENGs 100. In at least one embodiment, such a method 200 can convert a textile or pre-fabricated garment into a self-powered $R^F$-TENG 100 capable of harvesting electrostatic energy from a wearer's motion to power one or more electronic devices 120 (e.g., a wearable).

Figure 3:
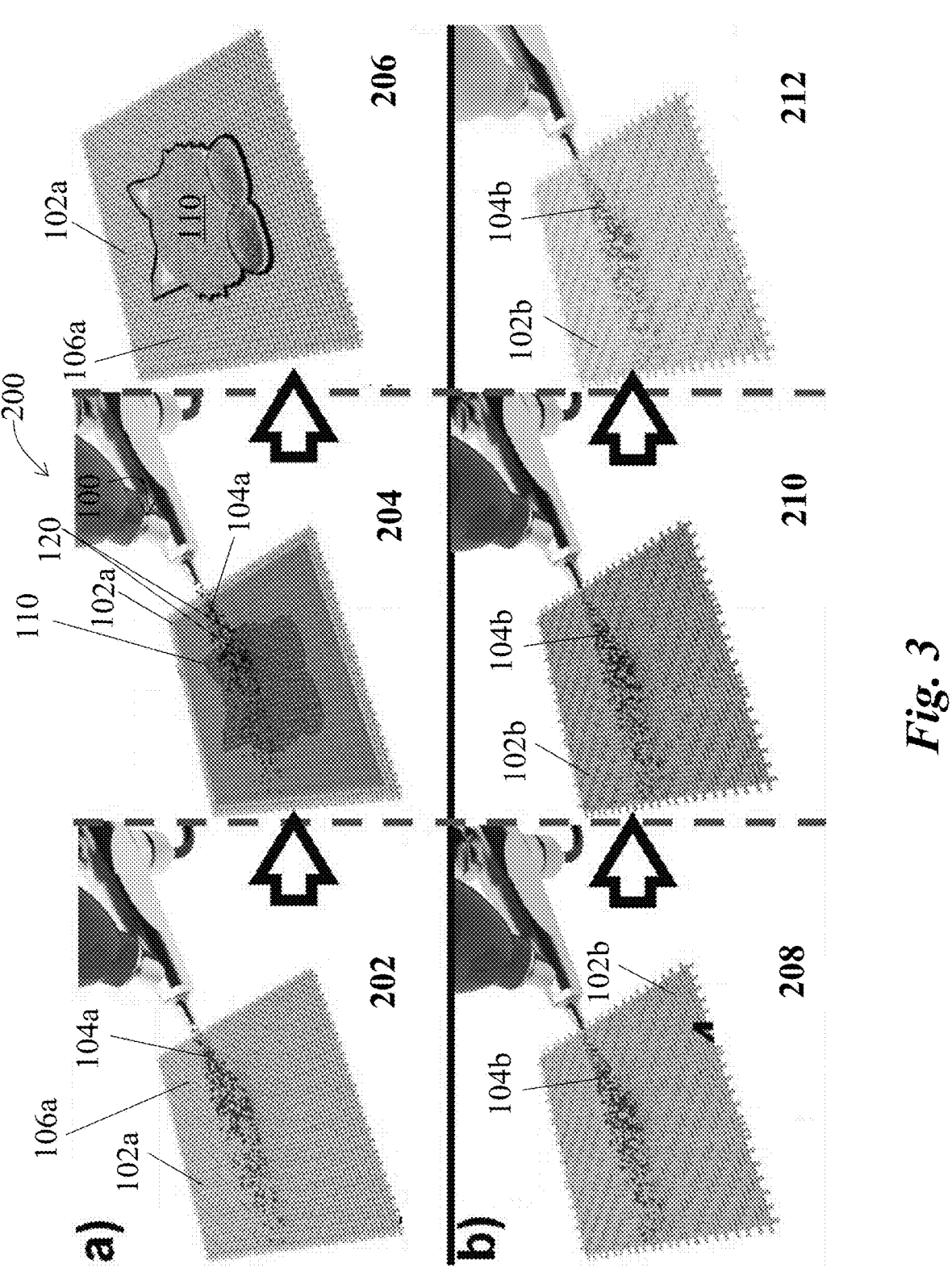
FIG. 3 illustrates the various steps of at least one method for manufacturing omniphobic textile-based $R^F$-TENGs of the present disclosure, with subpart (a) showing a schematic diagram of the fabrication of a first electrode of the $R^F$-TENGs, subpart (b) showing a schematic diagram of the fabrication of a second electrode of the $R^F$-TENGs, and subpart (c) showing various views of an assembled fabric-based $R^F$-TENGs

FIG. 3 illustrates a method 200 for manufacturing an $R^F$-TENG 100 of the present disclosure such method 200 comprising assembling a first electrode (subpart (a) of FIG. 3), assembling a second electrode (subpart (b) of FIG. 3), and affixing the first and second electrodes together such that the first textile substrate 102a is able to undergo friction with the electronegative layer 108 of the second electrode.

At step 202 (FIG. 3, subpart (a)), at least a first surface of the first textile substrate 102a is rendered omniphobic through silanization. This can be achieved by, for example, spray deposition of a layer 104a of a silanizing coating composition on one or more surfaces of the first textile substrate 102a.

In at least one embodiment, a 4.76% v/v solution of a fluoroalkylated organosilane in isopropanol can be sprayed (e.g., in a chemical hood) onto the first textile substrate 102a to form the layer 104a and the isopropanol is allowed to evaporate.

At step 204 (FIG. 3, subpart (a)), a plurality of conductive nanoparticles are applied to a silanized surface of the first textile substrate 102a to form the first electrode layer 106a of a first electrode. Such nanoparticles can be applied through spraying, brushing, or any other technique that can provide at least one layer of networked nanoparticles on a silanized surface of the first textile substrate 102a. In at least one embodiment, the first electrode layer 106a is applied as a thin, conformal monolayer.

The first electrode layer 106a can be applied to the first textile substrate 102a such that the layer 106a defines a shape that correlates with the shape of the component 110 to be used. For example, as shown in FIG. 3, a 5 wt. % suspension of AgNFs in toluene over can be sprayed over the first textile substrate 102a through a laser cut Teflon stencil mask (note that the mask is generally shaped as a cat and the embroidery component (applied in step 206) comprises a corresponding shape/contour). Spray deposition techniques in particular can result in a thin, conformal layer of highly networked nanoparticles, that preserve any flexibility, natural breathability, and light weight nature of the textile substrate 102a employed.

The omniphobic textile substrate 102a (i.e. with layer 104a applied thereto) patterned with the first electrode layer 106a is then covered at step 206 with the component 110. In at least one embodiment, the component 110 is stitched or embroidered to the underlying first textile substrate 102a via a thread or stitch 112. In at least one embodiment, the component 110 is only stitched or adhered to the first textile substrate 102a around its circumferential contour 111, although it can be adhered along a majority or even all of the area of the component 110 if desired. In certain embodiments, the component 110 can be otherwise adhered over the underlying components of the $R^F$-TENG 100, for example and without limitation, by an adhesive.

In this manner, while the body (middle portion) of the component 110 sits atop and adjacent to the first electrode 106a, the fibrous component 110 can undergo friction with the first electrode layer 106a (i.e. when the outer surface of the component 110 is pressed, rubbed, or otherwise manipulated by a user/wearer). Design details can also be embroidered on the component 110 as shown in subpart (c) of FIG. 4, whether to provide aesthetic qualities to the $R^F$-TENG 100, to provide a seat for one or more electronic devices 120 (described below), and/or to provide additional fibers to rub together during use to generate charges that can be used to power the circuit coupled with the $R^F$-TENG 100.

Additionally, in at least one embodiment, the component 110 can have a design/contour/area that either matches the shape of the first electrode layer 106a or is larger than (and wholly encompasses) the first electrode layer 106a. Accordingly, the component 110 can wholly cover the electrode layer 106a, thus protecting the conductive nanoparticles seated thereunder.

Figure 4:
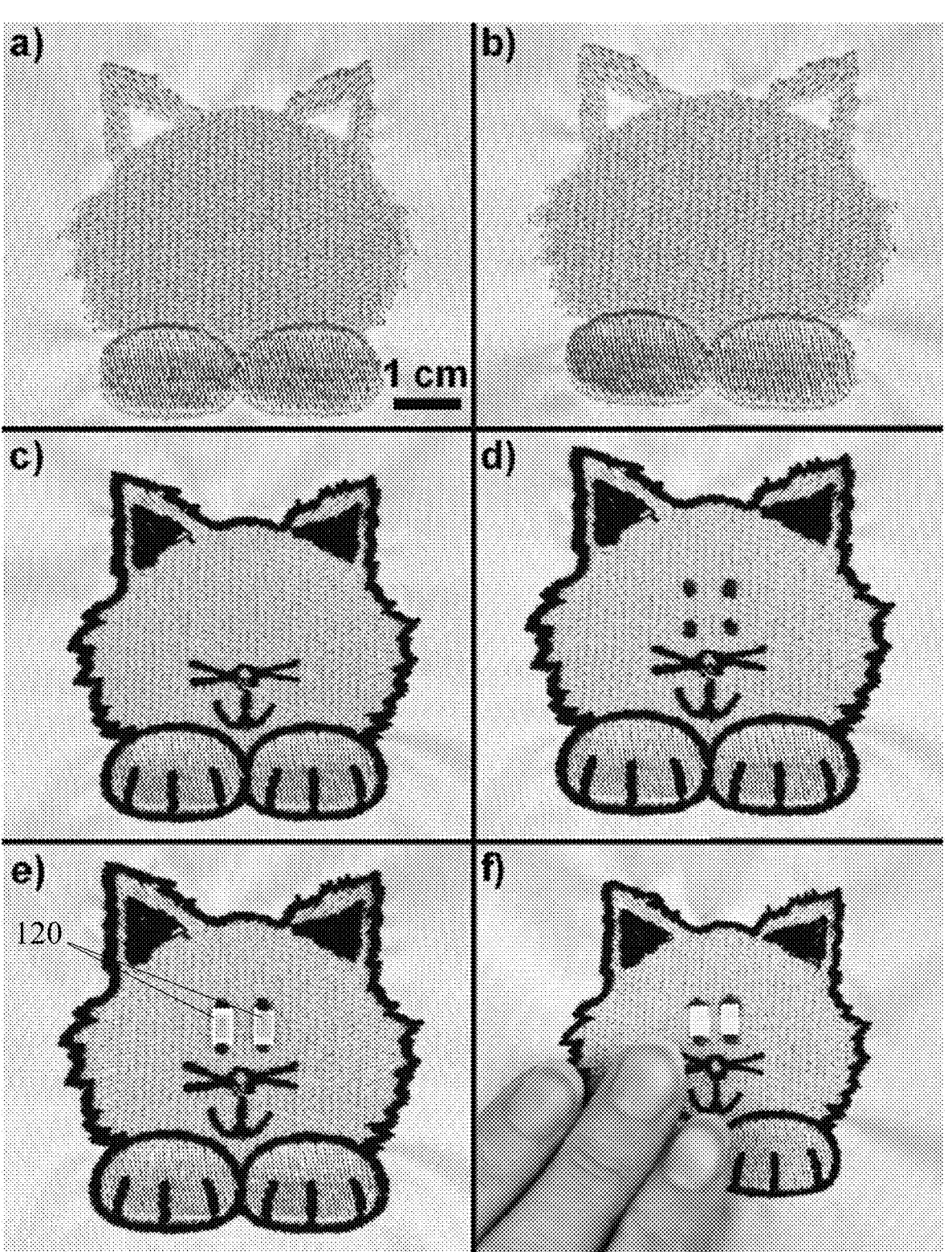
FIG. 4 shows embroidery process steps according to at least one method for fabricating a triboelectric generator of the present disclosure having an embroidery component shaped as a cat design with an area of about 6.25 cm$^2$, with subpart (a) showing the embroidery component applied over an electrode layer, subpart (b) showing the embroidery component rendered omniphobic following silanization, subpart (c) showing embroidered details applied to the embroidery component, subpart (d) showing droplets of conductive paint applied as a glue to the embroidered component, each in position to receive an electronic device thereon, subpart (e) showing two electronic devices (i.e. light emitting diodes (LEDs)) fixed to the conductive paint, and subpart (f) showing that the LEDs light up on tapping the embroidered component of the electronic textile.

Optionally, the top surface of the component 110 can be rendered omniphobic through silanization (see subpart (b) of FIG. 4). This can be achieved by, for example, spraying a layer 104c of any of the silanizing coating compositions hereof on the component 110 as described in other silanization steps of the method 200.

Now referring to subpart (b) of FIG. 3, assembly of the second electrode comprises rendering at least a first surface of the second textile substrate 102b omniphobic through silanization (step 208), applying a plurality of conductive nanoparticles in a monolayer to the omniphobic surface 104b of the second textile substrate 102b to form a second electrode layer 106b thereon (step 210), and applying an electronegative layer 108 (e.g., PTFE) over the second electrode layer 106b (step 212).

Step 208 can be performed using any of the silanizing coating compositions hereof either through spraying or other techniques. Similarly, at step 210 (FIG. 3, subpart (b)), a plurality of conductive nanoparticles are applied to the silanized surface of the second textile substrate 102b to form the electrode layer 106b of the second electrode. Akin to step 204 in connection with the first electrode, such nanoparticles can be applied through spraying, brushing, or any other technique that can achieve at least one layer of networked nanoparticles on a silanized surface of the second textile substrate 102b. The second electrode layer 106b is applied as a monolayer or a multi-layer as desired.

In at least one exemplary embodiment of method 200, a suspension of AgNFs is sprayed over silanized fibers of the second textile substrate 102b at step 210 and, after the suspension of AgNFs dry, the resulting highly networked NFs are encapsulated at step 212 by spraying an electronegative layer 108 thereover and curing the electronegative layer 108 at room temperature. The electronegative layer 108 applied at step 212 can comprise any thickness desired, with the goal of encapsulating (or otherwise protecting) the second electrode layer 106b. In at least one embodiment, the electronegative layer 108 can be about 8 μm thick.

The assembled first and second electrodes are then affixed together at step 214 (see FIG. 3, subpart (c)). In at least one embodiment, the first and second electrodes are sewn, stitched, or otherwise affixed together along the circumferential contour 111 of the component 110.

The omniphobic character of the $R^F$-TENG 100 hereof protects the electrode layers 106a, 106b from moisture, thus making these fabric-based devices waterproof and facilitates the cleaning thereof. Further, the spray deposition processes used in exemplary embodiments to render the textiles omniphobic and to deposit thin, conformal layers of highly networked conductive nanoparticles and PTFE preserve the flexibility, natural breathability (e.g., air permeability about 90.5 mm/s), and lightweight nature of the electronic textiles 100.

The methods of manufacturing the $R^F$-TENGs and electronic textiles disclosed herein are simple and scalable methods capable of transforming conventional garments and textiles into omniphobic and self-powered electronic textiles configured to power embedded electronic systems using the electrostatic energy generated by the natural motions of a wearer. Electronic textiles using the $R^F$-TENGs hereof can be manufactured at a low cost (e.g., less than 0.04 USD/cm$^2$) by combining textile-mounted electronics with embroidery and, in certain embodiments, the spray-based deposition of silanizing agents, highly networked conductive nanoparticles, and a conformable electronegative (e.g. PTFE) encapsulation solution. The current cost estimate to manufacture 6.25 cm$^2$ $R^F$-TENGs is less than US \$0.19, exclusive of labor and capital expenses. The total cost, itemized in Table 1, is based on the costs of small quantities of material and reagents and could be subject to lower prices based on volume discounts.

TABLE 1

| Itemized Cost of Manufacturing 6.25 cm² $R^F$-TENGs | |
| --- | --- |
| AgNF spray coating | \$0.090 |
| PTFE spray coating | \$0.050 |
| Omniphobic spray coating | \$0.040 |
| Thread for embroidery | \$0.003 |
| Textiles | \$0.003 |
| Total cost | \$0.19 |

Accordingly, the $R^F$-TENGs hereof are cost effective, lightweight, flexible, breathable, and can generate high output power densities (e.g., ~600 µW/cm$^2$). Further, the omniphobic salinization of the devices and materials hereof prevents bacterial proliferation and repels staining by aqueous solutions and organic liquids with surface tensions as low as 27.05 mN/m, rendering $R^F$-TENGs insensitive to changes in environmental moisture. The omniphobic embroidery component used in the $R^F$-TENGs also protects both the textile-mounted electronic components and the electrode layers (i.e. at least the electrode layer 106a) from moisture and overstretching ($\varepsilon_{max}$=55%), conferring these $R^F$-e-textiles with excellent stability under mechanical deformations and remarkable washing durability after at least 50 standard machine-washing cycles. Moreover, due to the embroidery component, a user can easily pinpoint the location of the $R^F$-TENGs, thus facilitating their use as self-powered tactile interfaces for controlling embedded/electronically coupled electronics. Furthermore, the combination of the same textile with several $R^F$-TENGs, with some serving as biomechanical energy transducers and others as tactile sensors, allows for battery-free electronic textiles that can be controlled by the wearer.

In describing representative embodiments, the disclosure may have presented a method and/or process as a particular sequence of steps. To the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps disclosed herein should not be construed as limitations on the claims. In addition, the claims directed to a method and/or process should not be limited to the performance of their steps in the order written, and one skilled in the art can readily appreciate that the sequences may be varied and still remain within the spirit and scope of the present disclosure.

Additionally, unless defined otherwise, all technical and scientific terms used herein have the same meaning as commonly understood by one of skill in the arts. Although any methods and materials similar to or equivalent to those described herein can be used in the practice or testing of the subject of the present application, the preferred methods and materials are described. Additionally, as used in this specification and the appended claims, the singular forms "a", "an" and "the" include plural referents unless the content clearly dictates otherwise. Thus, for example, where a $R^F$-TENG is coupled with a garment, at least one $R^F$-TENG is coupled with the garment. Further, unless specifically stated otherwise, the term "about" or "~" refers to a range of values plus or minus 10% for percentages and plus or minus 1.0 unit for unit values; for example, "about 1.0" refers to a range of values from 0.9 to 1.1.

EXAMPLES

Example 1: Design and Fabrication of $R^F$-TENGs $R^F$-TENGs were fabricated using commercially available cotton, spandex, and wool fabrics (Fabric Wholesale Direct, Inc.). These fabrics were rendered omniphobic by spraying a 4.76% v/v solution of a fluorinated organosilane in isopropanol thereon inside a chemical hood and letting the isopropanol evaporate at room temperature (~10 minutes). Trichloro(3,3,4,4,5,5,6,6,7,7,8,8,8-tridecafluorooctyl) silane ($CF_3(CF_2)_5CH_2$—$CH_2SiCl_3$ ("$C_8^F$"), trichloro(3,3,4,4,5,5,6,6,7,7,8,8,9,9,10,10,10-heptadecafluorodecyl) silane ($CF_3(CF_2)_7CH_2$—$CH_2SiCl_3$ ("$C_{10}^F$"), or trichloro(3,3,4,4,5,5,6,6,7,7,8,8,8,9,9,10,10,11,11,12,12,12-henicosafluorododecyl) silane ($CF_3(CF_2)_9CH_2$—$CH_2SiCl_3$ ("$C_{12}^F$") (all procured from Gelest Inc. Morrisville, PA) were used as fluoroalkylated silanizing agents (where specified in the examples below). The silanized textile exhibited an apparent static contact anglec $\theta_{app}^{H_2O}\approx155°$ with water (FIG. 3, subpart (c)) and $\theta_{app}^{C_{16}H_{34}}\approx122°$ with hexadecane.

After silanization, the textile was sprayed with a 5 wt. % suspension of AgNFs (Inframat Advanced Materials, LLC, Manchester, CT) in toluene over the fabric through a laser cut Teflon stencil mask and allowed to dry in a desiccator at 36 Torr for 20 minutes. The omniphobic fabric patterned with the AgNFs electrodes was then embroidered with a protective shape-matching design, which was also rendered omniphobic using the same spray silanization process described above. This step completed the fabrication of the top/first electrode of the fabric-based $R^F$-TENG.

The bottom/second electrode of the $R^F$-TENG (FIG. 3, subpart (b)) was fabricated by rendering the surface of a textile omniphobic and spraying AgNFs over the silanized fibers. After the suspension of AgNFs dried, the highly networked NFs were spray-coated with an ~8-µm-thick layer of PTFE (20% v/v solution of PTFE-N UV in N-Ethyl-2-Pyrrolidone; both Molykote®, DuPont, Wilmington, DE) and cured at room temperature for 2 hours.

Surface-mount device (SMD) electrical components were interconnected using a high strength conductive sewing thread (Lyofil 166; Unique Aviation Inc., Richmond Hill, Ontario, CA) and placed over the cured PTFE coating on the bottom/second electrode.

The top/first and bottom/second electrodes of the $R^F$-TENG were assembled by sewing them together along the contour of the embroidered design (see FIG. 3, subpart (c) and FIG. 4, subpart (c)). An embroidery machine (EverSewn Hero; EverSewn, Inc., Washington, MO) was used to integrate the $R^F$-TENGs into the textile substrate, securing the embedded electronics. The embroidered designs were also rendered omniphobic using the described silanization process.

A FEI Nova NanoSEM 200 scanning electron microscope (SEM) was used to investigate and characterize the structure of the cotton and spandex substrates, both before and after being sprayed with the silanizing solution in the case of the textiles, the AgNFs (shown in FIG. 3, subpart (c)), and the PTFE coating layer.

The inset labeled "TOP electrode" in FIG. 3, subpart (c) shows a representative SEM image of the conformal AgNFs coating of the fibers of the omniphobic fabric. The inset labeled "waterproof textile" of FIG. 3, subpart (c) shows an SEM image of a silanized cotton fabric that exhibits $\theta_{app}^{H_2O} \approx 155°$, indicating that the internal porosity of the textile and, consequently, its gas permeability remained unchanged after the silanization process. The inset labelled "BOTTOM electrode" in FIG. 3, subpart (c) shows an SEM image of the conformal PTFE encapsulation of the AgNFs on the second/bottom electrode.

Before imaging of the bare and PTFE-encapsulated fabric substrates, a ~20 nm layer of platinum was deposited using a sputter coater (208HR, Cressington Scientific Instruments, UK) at 40 mA filament current during 60 seconds. AgNF-coated fabric samples (not yet encapsulated) and individual AgNFs were imaged without any additional conductive coating. Electron accelerating potentials of 5.0 kV, spot-size of 3, and an Everhart-Thornley detector (ETD) were used to acquire images of all fabric samples at a working distance of 5-6 mm. High-resolution SEM images of individual AgNFs were obtained using a through-lens detector (TLD) in magnetic immersion mode at a working distance of 3.5 mm.

Example 2: Evaluation of Antimicrobial Properties

To evaluate the antimicrobial repulsion mechanism of the $R^F$-TENG-based electronic textiles hereof toward *Staphylococcus aureus* (*S. aureus*), untreated pieces of cotton (control samples) and omniphobic pieces of cotton ($R^F$-cotton) were cultured for 7 days in the presence of *S. aureus*.

*S. aureus* was cultivated in sterile 50 mL glass tubes containing untreated cotton (control sample) or omniphobic $R^F$-cotton samples. *S. aureus* colonies were grown in 10 mL potato dextrose broth (Teknova Inc., Hollister, CA) for 3 hours at 37° C., shaking the colony at 200 rpm. The *S. aureus* colony was then diluted 1:100 in fresh potato dextrose broth, which was then used to fill the glass tubes until the samples were fully submerged. After shaking the glass tubes for 3 hours at 37° C., the media was removed by aspiration and fresh potato dextrose broth was added. Thereafter, the media was replaced with fresh potato dextrose every 24 hours over the 7 day period.

Figure 5:
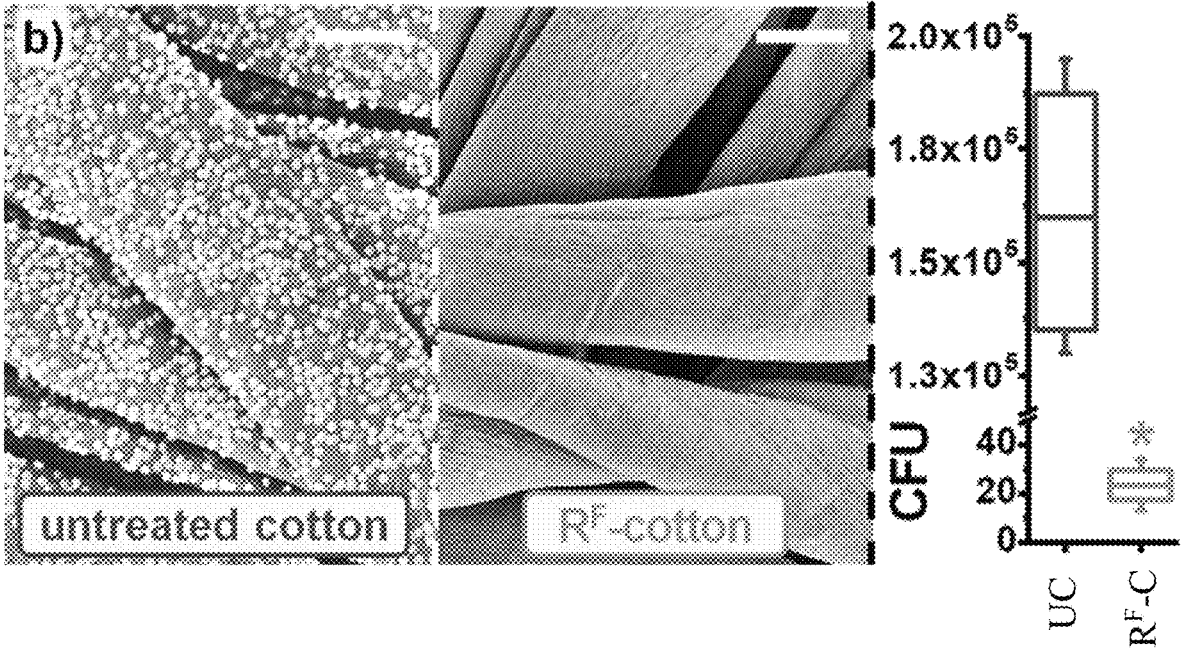
FIG. 5 shows scanning electron microscopy (SEM) images of the control ("untreated cotton" or UC) and omniphobic $R^F$-cotton samples ("$R^F$-cotton" or $R^F$-C) after 7 days of growth in media with *S. aureus* (scale bars 10 µm) and graphical data representative of the reduction of *S. aureus* growth, colony forming units (CFU) on $R^F$-cotton samples as compared to control samples after culturing for seven days (quantified using Bactiter-Glo (* indicates p<0.05, error bars±SD; n=7))

FIG. 5 shows SEM images of the control and omniphobic samples taken following the 7-day period and clearly support that *S. aureus* was repelled from the surface of the $R^F$-cotton and unable to proliferate thereon.

To confirm the reduction in *S. aureus* observed in the SEM images, the number of viable cells on pieces of $R^F$-TENG were quantified using a Bactiter-Glo assay by measuring the amount of ATP present on the samples after cell lysis. The protocol provided with the Bactiter-Glo Microbial Cell Viability Assay Kit (Promega Corporation, Madison, WI) was followed to quantify the number of viable *S. aureus* cells present on the samples.

Primarily, the samples were placed on different well plates and Bactiter reagent was added to each well plate until all samples were covered. The samples were incubated at room temperature under dark conditions for 5 minutes. After incubation, 200 μL of the Bactiter reagent covering each sample was transferred to an opaque 96-well plate. Luminescence was measured using a BioTek Synergy™ 4 Hybrid Microplate Reader (BioTek Instruments, Inc., Winooski, VT) and the resulting values converted to concentrations using a standard curve of *S. aureus* grown in solution to an optical density (OD) at 600 nm of $OD_{600}=0.8$. p-values lower than 0.05 were considered statistically significant.

Colony forming units (CFU) of *S. aureus* were then quantified by spiral plating (Spiral Biotech, Inc., Norwood, MA) and the use of counting grids that correlated the colonies present on the spiral plate to the volume deposited in the area. *S. aureus* colonies were counted according to the instructions provided by the manufacturer of the Bactiter-Glo Microbial Cell Viability Assay Kit and the guidelines outlined in the *Bacteriological Analytical Manual* published by the U.S. Food and Drug Administration (8th edition).

The CFU data was analyzed with the R language for statistical computing (v.3.5.3) to identify statistically significant differences between the control samples (untreated cotton) and omniphobic cotton using the Non-Parametric Mann-Whitney U test. p-values lower than 0.05 were considered statistically significant. A total of 7 sample pairs (control and omniphobic) were used for the graph shown in FIG. 5.

The quantification data related to *S. aureus* CFUs present on the surface of the untreated and $R^F$-cotton samples after culturing for 7 days supports the SEM image findings; i.e. that *S. aureus* was repelled from the surface of the $R^F$-cotton and unable to proliferate thereon.

SEM images were also analyzed (not shown). The control and omniphobic cotton samples were removed from the cell culture plate and dried under a gentle stream of nitrogen. Note that the omniphobic cotton samples remained omniphobic after the 7-day period and were easily dried by tilting them. The following protocol was then used to fix the bacteria to the cotton fibers of the samples.

First, the samples were emerged for 1 hour in a 2.5% glutaraldehyde solution in 0.1 M sodium cacodylate buffer. Second, the samples were gently transferred to a 1% osmium tetroxide solution in 0.1 M sodium cacodylate and maintained emerged for 1 hour. Third, the osmium tetroxide salutation was exchanged for anhydrous ethanol to dehydrate the bacteria. After the samples were emerged in anhydrous ethanol for 10 minutes, the samples were dried under a gentle stream of nitrogen, placed in a desiccator, and coated with several drops of hexamethyldisilazane to chemically dry the samples. The samples were kept in the desiccator at 36 Torr overnight and thereafter mounted on SEM specimen stubs (Ted Pella Inc., Redding, CA) using double-sided adhesive carbon tape (Ted Pella Inc., Redding, CA)

and sputter-coated with a ~50 nm-thick layer of platinum before imaging at an accelerating voltage of 5 kV.

Example 3: Conversion of Mechanical Energy into Electric Energy Using $R^F$-TENG-Based Electronic Textiles The electrical output characteristics of the $R^F$-TENGs were assessed using an Infinii Vision MSO-X-3104T oscilloscope (Keysight Technologies, Santa Rosa, CA) at a rate of $3\times10^5$ samples per second. User motions such as tapping, bending, stepping, and rubbing were used for the electrical output measurements. The electrical measurements assessed included open-circuit voltage, short-circuit current, output current with different loads, output voltage with different loads, and the charging curves of different capacitors over time.

Figure 6:
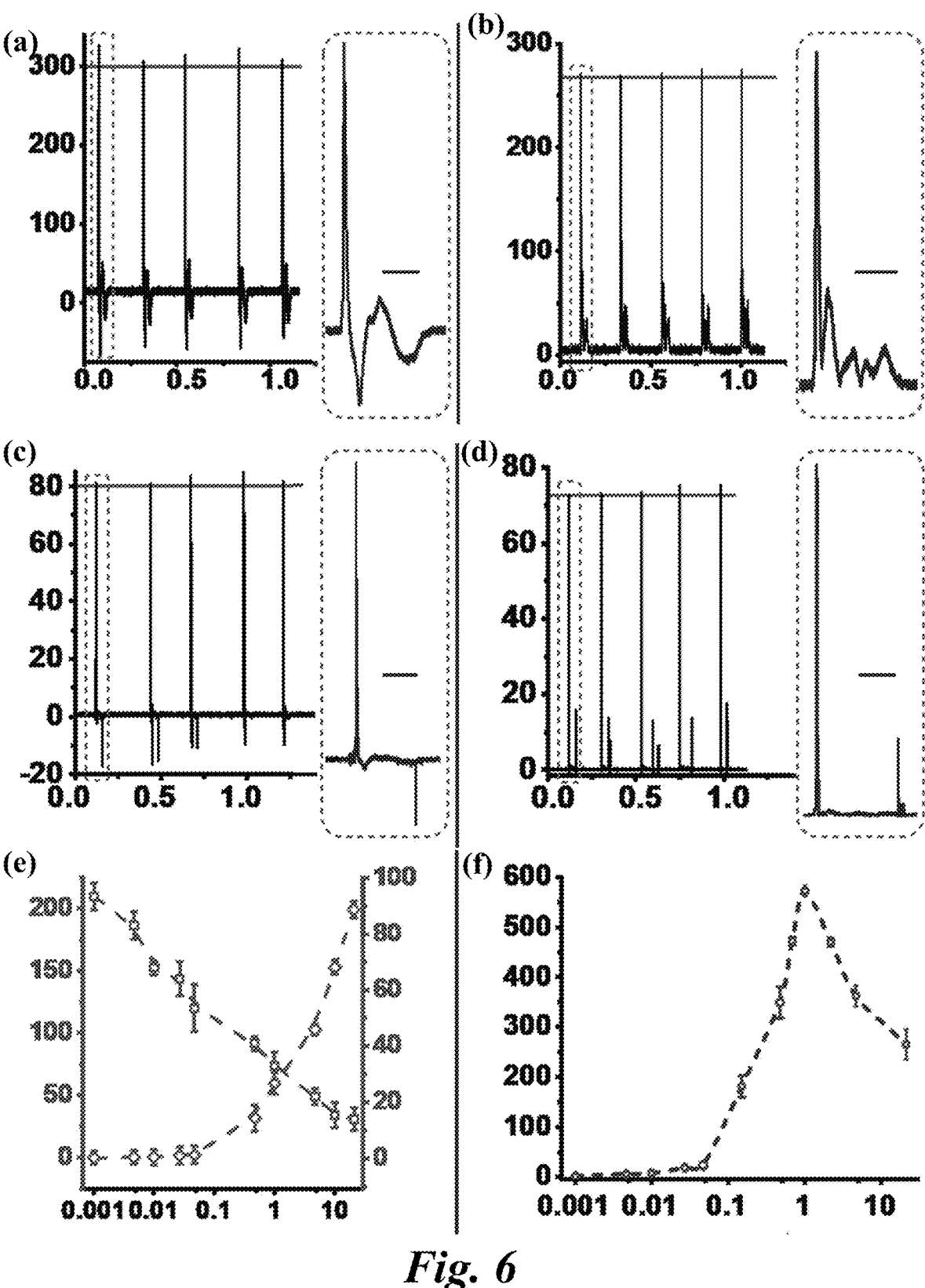
FIG. 6 shows graphical data representative of the production of electric energy using a 6.25 cm$^2$ $R^F$-TENG e-textile of the present disclosure, with subpart (a) showing open-circuit voltage peaks (before rectification) generated by tapping the $R^F$-TENG with two fingers at a frequency of ~4

FIGS. 6 and 7 show the electrical output characteristics of various textile-based $R^F$-TENGs fabricated per Example 1, each having a surface area of about 6.25 cm². The triboelectric voltages generated each time a user taps the $R^F$-TENG were ~300 V (see FIG. 6, subpart (a) and FIG. 7). The short-circuit current produced by each tap was ~80 μA (see FIG. 6, subpart (c)).

Further, embedding a full-wave rectifier into the embroidered design (see FIG. 2, subpart (b)) reverses the negative voltages and currents generated by the $R^F$-TENG as shown in FIG. 6, subparts (b) and (d), respectively. The rectified open-circuit voltages (~270 V) and short-circuit currents (~72 μA) generated by the textile-based $R^F$-TENGs hereof having two single-layer electrodes were comparable to those of tribogenerators with multi-layered and nanotexturized surfaces.

FIG. 6, subpart (e) shows the effect of the external load on the voltage and current outputs of the textile-based $R^F$-TENGs hereof. As expected, when the external load increased, the current output through the load decreased while the output voltage increased. The output power density of the $R^F$-TENGs reached a maximum of ~600 μW/cm² when coupled to an impedance matching load of 1 MΩ (see FIG. 6, subpart (f)).

Time needed to charge a 2 mF capacitor was also assessed. FIG. 8 shows $R^F$-TENGs fabricated according to the process of Example 1 that were used to charge 4 different capacitors (2 mF, 3 mF, 4 mF, and 5 mF) using a universal testing machine (MTS Insight 10; MTS Systems Corp., Eden Prairie, MN), with a 1 kN load cell covered with cotton fabric (model 661.18.F01), which tapped the $R^F$-TENGs at a frequency of 4 Hz and a constant pressure of ~0.47 psi. The cat design had an area of ~6.25 cm² (FIG. 8, subparts (e) and (f)), the fish design had an area of ~4.5 cm² (FIG. 8, subparts (c) and (d)), and the cherry design had an area of ~2.25 cm². The plots in FIG. 8, subparts (b), (d), and (f) verify the trend observed in previous studies—that capacitors with smaller values of capacitance are charged and get saturated faster than those with higher values of capacitance.

Example 4: Stain Repellency and Machine-Washing Resistance

Three commercially available fluoroalkylated organosilanes ($C_8^F$, $C_{10}^F$, $C_{12}^F$) were used to evaluate the effect of the chain length of the organosilane on the wetting properties of the electronic textiles hereof for water (surface tension 72.8 mN/m) and hexadecane (surface tension 27.05 mN/m). Perhaps more specifically, $\theta_{app}^{H_2O}$, $\theta_{app}^{C_{16}H_{34}}$, $(\theta_a-\theta_r)^{H_2O}$, $(\theta_a-\theta_r)^{C_{16}H_{34}}$ were characterized on cotton, spandex, and wool samples silanized using the following fluoroalkylated organosilanes: $C_8^F$, $C_{10}^F$, and $C_{12}^F$.

The silanes were obtained from Gelest Inc. (Morrisville, PA) and used without further purification. The textiles to be tested were silanized by spraying a 4.76% v/v solution in isopropanol of one of the fluorinated organosilanes specified above over the surface of the textile at issue, thereafter allowing the isopropanol to dry at room temperature (~10 minutes).

Primarily, air permeability was measured across the $R^F$-TENGs following ASTM D1776 specifications using a custom-made air permeability test apparatus calibrated for the untreated textiles used. A goniometer system (Krüss Drop Shape Analyzer DSA25) was used to measure the static contact angle and contact angle hysteresis at room temperature (20-25° C.). The volume of the droplets used in the measurement was ~10 μL to avoid gravity effects. 5 different droplets were used for each measurement and the average of those measurements was reported as the result (see FIG. 9, subpart (a)).

The apparent static contact angle of water ($\theta_{app}^{H_2O}$) on cotton, spandex, and wool ranged from 150°-160°, increasing proportionally with the roughness of the textile. This correlation between roughness of the textile and the apparent static contact angle was also observed for hexadecane $\theta_{app}^{C_{16}H_{34}}=95°\text{-}125°$, see FIG. 9, subpart (a)). The $\theta_{app}$ [@app] of each functionalized fabric increased with the chain length of the organosilane, while the contact angle hysteresis $(\theta_a-\theta_r)$ varied from 5°-20° for both water and hexadecane and decreased with the chain length. While the voltage output of the $R^F$-TENGs did not show any noticeable trend with the chain length of the fluorinated organosilane, $C_{12}^F$ was chosen to render both the $R^F$-TENG and the substrate omniphobic to maximize their stain repellency, which was inversely proportional to the contact angle hysteresis.

FIG. 9, subpart (a) illustrates how aqueous solutions and organic liquids with surface tensions as low as 27.05 mN/m (hexadecane) do not wick into $C_{12}^F$-treated electronic textiles and can, in fact, be easily cleaned by wiping them with an absorbent paper towel (illustrative video in supporting materials (not shown)).

The washing durability of the electronic textiles powered by the $R^F$-TENGs hereof was also tested by laundering in a commercial washing machine (TR3000WN, Whirlpool) electronic textile with different $R^F$-TENGs embroidered on their surfaces in repeated (50) standard washing cycles using 2 kg of untreated clothes as ballast. All washing cycles were performed according to AATCC Test Method 135 using 60 L of water to wash and 60 L of water to rinse at 22° C. (delicate laundering program; 120 rpm, 8 minute duration). Each washing cycle ended with a 3 minute spinning process at ~450 rpm.

FIG. 9, subpart (b) shows how, after 50 washing cycles, $R^F$-TENGs could still charge a 2 mF capacitor through a diode bridge rectifier (electronic components embedded in the electronic textile) without any significant decrease in performance.

Voltage peaks generated by each tactile interaction/from fabric-based tactile interface data (in all cases; not limited to this Example) were acquired and processed by a sewable, multichannel microcontroller board (GEMMA V2; Adafruit Industries, New York, NY) that also served as an analog to digital converter with a quantization capacity of 8 bits. Threshold voltages were specified for each tactile zone to ensure the microcontroller would be able to differentiate touch events from the accidental bending or stretching of a $R^F$-TENG.

The maximum voltage across the capacitor after 18 seconds of continuous tapping (tapping frequency 4 Hz, pressure ~0.47 psi) was proportional to the size of the $R^F$-TENG and therefore to its maximum output voltage (see, e.g., FIG. 8 and FIG. 9, subpart (b)).

After vigorous spinning and abrasive action of the ballast during 50 washing cycles, the minimal change in $\theta_{app}^{H_2O}$ of omniphobic electronic textiles indicated that the silanization remained stable, which assisted in protecting the embedded electronic components from corrosion during the washing cycles (see FIG. 9, subpart (c)). The small decrease in open-circuit voltage and short-circuit current of the $R^F$-TENG observed after washing was attributed to mechanical fatigue on the electrical interconnects inside the $R^F$-TENG, resulting in higher contact resistance values.

Example 5: Harvesting Biomechanical Energy

The embroidery component of the textile-based $R^F$-TENGs on conventional cloth items or other materials allows for the harvesting of energy from the natural motions of a wearer without compromising comfort. As shown in FIG. 10, 3 separate use cases of the electronic textile hereof were studied—1) one $R^F$-TENG embroidered on the bottom of a sock (FIG. 10, subpart (a)); 2) one $R^F$-TENG embroidered on the side of a polo shirt (FIG. 10, subpart (b)); and 3) one $R^F$-TENG elbow patch (FIG. 10, subpart (c)).

FIG. 10, subpart (a) shows human body energy harvested from walking with an electronic textile $R^F$-TENG embroidered on the bottom of a woolen sock (with the added benefit that the electronic textile provides added padding to maximize the comfort of the user). Similarly. $R^F$-TENGs can serve as decorations for shirts where, as in subpart (b) of FIG. 10, it harvests energy when the wearer's arms get into rubbing contact with the surface of the electronic textile. Additionally, due to the flexibility and stretchability of the $R^F$-TENGs, the electronic textiles hereof can be used to fabricate elbow patches (and, similarly, knee patches) capable of harvesting energy from the bending of the arm, due to the relative sliding of the top and bottom electrode layers of the $R^F$-TENG (see subpart (c) of FIG. 10).

Example 6: $R^F$-TENGs as Human-Machine Interfaces

The embroidered structure of the textile-based $R^F$-TENGs hereof can produce fashionable, comfortable, washable, and self-powered electronic textiles with triboelectric interfaces for user interaction. Two $R^F$-TENGs were incorporated into a polo shirt to fabricate an audio system controller with a compact fashionable design that fits within the shirt collar.

FIGS. 11 and 12 show the self-powered polo shirt of FIG. 10, subpart (b) that had $R^F$-TENGs under the arms on both sides of the shirt, and two self-powered triboelectric interfaces (located on the collar of the shirt). The interfaces were configured to change the volume, pause, and resume audio playable over a music player integrated into the textile.

The controls for play/pause were located on the right side of the collar, while the volume control was available on the left side of the collar. The different layers of the audio control interface on the collar are detailed in FIG. 12 and were assembled pursuant to methods and schema known in the art. Each triboelectric interface had different sensing areas embroidered using threads of different colors (light and dark blue; see FIG. 12) for indication purposes and raised patterns of different heights to facilitate tactile perception.

As illustrated in FIG. 11, the wearer could play and pause audio by gently pressing the two triboelectric sensing areas on the right side of the collar of this electronic textile (see FIG. 11, subpart (b)). Similarly, on the left side of the collar, the user could slide their fingers up or down over the triboelectric area to increase or decrease the volume of the audio or mute the audio by pressing the short triboelectric area (see FIG. 11, subpart (c)).

This electronic textile was used and tested after 50 washing cycles without visible or otherwise apparent damage or degradation in performance.

The invention claimed is:

1. An triboelectric nanogenerator comprising:
a first electrode layer affixed to a first textile substrate;
a second electrode layer affixed to a second textile substrate; and
an electronegative layer positioned on or over the second electrode layer and in a position relative to the first electrode layer such that the first textile substrate is able to undergo friction with the electronegative layer;
wherein each of the first and second electrode layers comprises a plurality of conductive nanoparticles arranged on a surface thereof and are electrically charged by the friction between the first textile substrate of the first electrode layer and the electronegative layer.

2. The triboelectric nanogenerator of claim 1, further comprising a component positioned over the first electrode layer and coupled with both the first electrode layer and the second electrode layer.

3. The triboelectric nanogenerator of claim 2, wherein the component comprises a pattern or applique embroidered onto a substrate or is embroidered directly to the first textile substrate.

4. The triboelectric nanogenerator of claim 2, wherein a surface of the component is omniphobic.

5. The triboelectric nanogenerator of claim 2, wherein at least one of the one or more electronic devices comprises a human machine interface (HMI).

6. The electronic textile of claim 5, further comprising at least one HMI in electric communication with at least one of the one or more electronic devices.

7. The triboelectric nanogenerator of claim 1, wherein the first electrode layer is affixed to a silanized surface of the first textile substrate and/or the second electrode layer is affixed to a silanized surface of the second textile substrate.

8. The triboelectric nanogenerator of claim 1, further comprising one or more electronic devices in electric communication with at least the second electrode layer.

9. The triboelectric nanogenerator of claim 1, further comprising a garment to which the component coupled with both the first and second electrode layers is applied.

10. The triboelectric nanogenerator of claim 1, wherein each of the first and second electrode layers comprises a plurality of conductive nanoparticles.

11. The triboelectric nanogenerator of claim 10, wherein the conductive nanoparticles comprise silver nanoparticles, silver nanoflakes, or carbon nanoflakes.

12. The triboelectric nanogenerator of claim 1, wherein each of the first and second networks of conductive nanoparticles comprises a monolayer of conductive nanoparticles.

13. The triboelectric nanogenerator of claim 1, wherein the first textile substrate and the second textile substrate both comprise a stretchable and/or flexible material.

14. The triboelectric nanogenerator of claim 1, wherein the electronegative layer comprises a coating composition comprising polytetrafluoroethylene (PTFE), acetal, garolite G-10, polyvinyl chloride or a combination of any of the foregoing.

15. A method of manufacturing an e-textile comprising:
affixing one or more triboelectric nanogenerators to a textile capable of harvesting electrostatic energy from a wearer's motion to power one or more electronic devices;
wherein the one or more triboelectric nanogenerators comprises:
  a first electrode layer affixed to a first substrate,
  a second electrode layer affixed to a second substrate,
  an electronegative layer positioned on or over the second electrode layer and in a position relative to the first electrode layer such that the first substrate is able to undergo friction with the electronegative layer, and
  a component positioned over the first electrode layer and coupled with both the first electrode layer and the second electrode layer,
  wherein each of the first and second electrode layers comprises a plurality of conductive nanoparticles arranged on a surface thereof and are electrically charged by the friction between the first substrate of the first electrode layer and the electronegative layer.

16. The method of claim 15, further comprising assembling the first electrode layer by:
rendering at least a first surface of a first substrate omniphobic through silanization;
applying a plurality of conductive nanoparticles in a monolayer to the omniphobic surface of the first substrate to form the first electrode layer thereon; and
applying the electronegative layer as a coating composition.

17. The method of claim 15, further comprising affixing the first and second electrodes together along at least a circumferential contour of the component.

18. The method of claim 15, further comprising electrically coupling at least one electronic device to at least the second electrode layer via one or more conductive wires or threads embedded in the component.

19. The method of claim 15, further comprising:
rendering at least a top surface of the component omniphobic through silanization; and
coupling the one or more triboelectric generators to the textile in a location conducive to a user of the textile or garment manipulating the component upon movement or touch.

20. The method of claim 15, wherein the textile comprises a garment or a wearable.

* * * * *